United States Patent [19]
Takagi et al.

[11] Patent Number: 5,165,001
[45] Date of Patent: Nov. 17, 1992

[54] GUIDED-WAVE OPTICAL BRANCHING DEVICE

[75] Inventors: Akihiro Takagi; Masao Kawachi; Kaname Jinguji, all of Mito, Japan

[73] Assignee: Nippon Telegraph and Telephone Corporation, Tokyo, Japan

[21] Appl. No.: 685,131

[22] Filed: Apr. 15, 1991

[30] Foreign Application Priority Data

Apr. 16, 1990 [JP] Japan .................................. 2-99954
Mar. 26, 1991 [JP] Japan .................................. 3-61808

[51] Int. Cl.$^5$ .............................................. G02B 6/26
[52] U.S. Cl. ..................................... 385/42; 385/43
[58] Field of Search ..................... 350/96.15, 96.16; 385/39, 41, 42, 129, 43

[56] References Cited

U.S. PATENT DOCUMENTS 3,850,503 11/1974 Riseberg et al. ................. 350/96.34
4,669,816 6/1987 Thompson ....................... 350/96.15
5,044,715 9/1991 Kawachi et al. ....................... 385/42

FOREIGN PATENT DOCUMENTS 287408 11/1990 Japan .

OTHER PUBLICATIONS

"Analysis of the Coupling Characteristics of a Tapered Coupled Waveguide System," Cai et al., Journal of Lightwave Technology, vol. 8, No. 1, Jan. 1990, pp. 90-98.
"Analysis of the Coupling Characteristics of a Tapered Three-Guide Coupled System," Cai et al., Journal of Lightwave Technology, vol. 8, No. 10, Oct. 1990, pp. 1621-1629.
"Broadband Silica-Based Optical Waveguide Coupler with Asymmetric Structure", Electronics Letters, Jan. 18, 1990, vol. 26, No. 2, pp. 132-133.
"Silica-Based Single-Mode Waveguides on Silicon and their Application to Guided-Wave Optical Interferometers", Takato et al., Journal of Lightwave Technology, vol. 6, No. 6, Jun. 1988, pp. 1003-1010.

Primary Examiner—Frank Gonzalez
Attorney, Agent, or Firm—Spencer, Frank & Schneider

[57] ABSTRACT

A guided-wave optical branching device having optical waveguides disposed on a substrate. The waveguides are partially arranged to be close to each other to form a tapered directional coupler in which the waveguides are point symmetrical or line symmetrical. Alternatively, the waveguides are neither line symmetrical nor point symmetrical. The tapered directional coupler reduces the wavelength dependence of the coupling ratio of the output power derived from the branching device. The widths of the waveguides in the parallel coupling region, the length of the coupling region in the symmetrical or asymmetrical directional coupler, the asymmetrical parameters or the like are set at values determined in accordance with the wavelength range used, so that the wavelength dependence of the coupling ratio of the power between the input port and the output port is reduced in a desired wavelength range, for example, 1.2 $\mu$m-1.8 $\mu$m.

13 Claims, 39 Drawing Sheets (ASYMMETRICAL) 
600

(ASYMMETRICAL) 
700

PHASE DIFFERENCE $\phi_3$

GUIDED-WAVE OPTICAL BRANCHING DEVICE

BACKGROUND OF THE INVENTION

1. Field of the Invention

The present invention relates to a guided-wave optical branching device preferably used for a component in an optical communication system and, in particular, to a guided-wave optical branching device in which the wavelength dependence characteristics of a power coupling ratio is reduced.

2. Description of the Prior Art

In order to promote a commercial communication service using optical fiber transmission technologies, it is required to develop various kinds of optical devices in addition to optical fibers, light emitting devices and light receiving devices. Among these optical devices, an optical branching device is one of the most essential optical components, and it is required to provide optical branching devices with various values of a branching ratio or a coupling ratio such as 50%, 20% or several %. Especially, there is a great demand for an optical branching device having a coupling ratio which is less dependent on wavelength in a wide range of wavelength.

Optical branching devices are also called optical couplers, and based on their device configuration, are classified into (1) bulk type, (2) fiber type and (3) waveguide type.

A bulk type device is fabricated by combining micro optical lenses, prisms, interference filters with interference films and so on with each other to realize an optical branching device with a lower degree of wavelength dependence. The bulk type device is now in practical use. However, some problems remain unsolved in the bulk type optical branching device with respect to long fabricating and adjusting time, long-term reliability, cost and device size.

A fiber type device uses an optical fiber material and is fabricated by the steps of abrading, drawing and fusion splicing. It is possible to form an optical branching device with a lower degree of wavelength dependence. However, there is a disadvantage in that a skilled craftsman's work is required in the manufacturing process and reproducibility of the device is poor, so that this device is not suitable for mass-production.

In contrast to the above two types of optical branching devices, the guided-wave type device has an advantage in that a large number of devices can be fabricated at the same time or mass-manufactured on a single planar substrate by using a photolithography process and is a noteworthy optical branching device to be used widely in the future.

FIGS. 36A-36C show a plan view and cross sectional views of a structure of a conventional symmetrical optical branching device. FIG. 37 illustrates its characteristics with respect to its coupling ratio. This first type of prior art optical branching device is disclosed in "Silica-Based Single-Mode Waveguides on Silicon and their Application to Guided-Wave Optical Interferometers" by Norio Takato et al., JOURNAL OF LIGHTWAVE TECHNOLOGY, Vol. 6, No. 6, June 1988, pp 1003-1010.

In the optical branching device as shown in FIGS. 36A-36C, two optical waveguides 21a and 21b, each having the same width, are placed on a planar substrate 21, and a directional coupling portion 22 is formed by making portions 22a and 22b of the optical waveguides 21a and 21b in close proximity to each other. Components 23a and 23b are input ports of the optical waveguides 21a and 21b, respectively, and components 24a and 24b are output ports of the optical waveguides 21a and 21b, respectively.

It should be noted that in the present specification, an optical waveguide means not only a combined structure of a core and a clad but also a core itself. In FIGS. 36B and 36C, cores as the optical waveguides 21a, 21b, 22a and 22b are buried in a clad layer 25 arranged on the substrate 21.

The coupling ratio as a function of wavelengths for the first prior art optical branching device, where the width of the two optical waveguides 22a and 22b is the same within the entire coupling portion 22, is a substantially sinusoidal function as shown in FIG. 37. For example, even if the coupling ratio is 50% at a wavelength of 1.3 $\mu$m, the coupling ratio is increased to 100% at a wavelength of 1.55 $\mu$m. This means that the coupling ratio varies by a relatively large amount even if the wavelength fluctuates by a small amount, so that the coupling ratio characteristics have a substantial wavelength dependence.

FIGS. 38 and 39 are a plan view showing a structure of an asymmetrical optical directional coupler and its characteristics with respect to its coupling ratio. This structure is disclosed, for example, in Laid-Open Japanese Patent Application No. 287408/1990.

In the optical directional coupler shown in FIG. 38, two optical waveguides 31a and 31b having constant widths which are different from each other are placed on a planar substrate 31, and a directional coupling portion 32 is formed by making portions 32a and 32b of the optical waveguides 31a and 31b in close proximity to each other. The directional coupler 32 is so designed that an input light wave from an input port 33a is branched to output ports 34a and 34b. Tapered waveguide portions 35a and 36a are connected to portions of the waveguide 31a in the vicinity of the input and output ports 33a and 34a so that the tapered waveguide portions 35a and 36a have a smoothly tapered shape so as not to produce a radiation mode in order to establish a good matching with external optical fibers to be connected to the input and output ports.

In the second example of a prior art device shown in FIG. 38, in order to realize a branching operation at a specific coupling ratio in a wide wavelength range, the width of the specific portion 32a and that of the specific portion 32b of the optical waveguides 31a and 31b, respectively, in the coupling portion 32 are made different from each other, while each width has a constant value. The device thus structured can be designed so as to establish a coupling ratio such as 50%±10%, 20%±5% and 5%±3% in a desired wavelength range, as shown in FIG. 39.

However, in the case of designing an optical coupler which should satisfy a severe condition, for example, where the coupling ratio is 50%±1% in the vicinity of a wavelength of 1.4 $\mu$m and the coupling ratio is 50%±2% in the vicinity of the wavelength region between 1.3 $\mu$m and 1.5 $\mu$m, there is a disadvantage in that a wavelength range (1.3 $\mu$m-1.5 $\mu$m) having a flat coupling ratio characteristic is varied and a designed coupling ratio is not attained in the desired wavelength range between 1.3 $\mu$m and 1.5 $\mu$m. And also, as seen in FIG. 38, the coupling ratio characteristic in the desired range of the wavelength is not flat but varies between several % and ten plus several %, and therefore, in the second example of the prior art, a guided-wave optical branching device of a wide wavelength operation type is not satisfactorily formed, and accordingly cannot be applied to an optical communication system.

Furthermore, in the device of the second example of the prior art, the radiating power loss in the curved portion of the narrow optical waveguide is relatively high. For example, the power loss is increased by about 0.7 dB more than for a conventional symmetrical directional coupler of the first example of the prior art having a constant waveguide width. Thus, the device is not applicable to an optical communication system. This is because the widths of the input and output ports are not the same in the entire directional coupler of the second prior art example.

SUMMARY OF THE INVENTION

In view of the above, it is an object of the present invention to provide a practical guided-wave optical branching device which has coupling ratio characteristics having a wide wavelength range.

It is another object of the present invention to provide a practical guided-waved optical branching device in which the widths of the input and output ports of a directional coupler are made equal to each other, and the wavelength dependence of the coupling ratio in a desired wavelength range, for example, a range between 1.3 $\mu$m and 1.6 $\mu$m, is reduced in comparison to a conventional guided-wave optical branching device.

It is a further object of the present invention to provide a practical guided-waved optical branching device in which the power loss of the entire device is very small so that it is easy to design the drive.

In order to achieve these objects, a guided-wave optical branching device comprises:

a substrate;

at least two optical waveguides disposed on the substrate, at least one end of the at least two optical waveguides being an input port and at least the other end of the at least two optical waveguides being an output port;

at least one directional coupler having a portion of the at least two optical waveguides arranged in close vicinity to each other, widths and depths of optical waveguides at both ends of a parallel coupling region in a coupling region of the at least one directional coupler being substantially equal to widths and depths of the optical waveguides at the input port and the output port; and at least one asymmetrical directional coupler formed at least in one portion in the at least one directional coupler in such a way that the widths of the two optical waveguides in the parallel coupling region are different from each other at least partially, wherein the widths of the optical waveguides in the parallel coupling region, the lengths of the coupling region of the at least one asymmetrical directional coupler, the length of the coupling region of at least one symmetrical directional coupler formed in a symmetrical coupling portion other than the asymmetrical directional coupler in the at least one directional coupler and asymmetry parameters are determined in accordance with a wavelength region to be used, so that the wavelength dependence of the coupling ratio of the light power between the input port and the output port is reduced in the wavelength region.

Here, the at least one asymmetrical directional coupler may be so arranged that the at least two optical waveguides forming the coupling region including the parallel coupling region of the at least directional coupler are substantially line symmetrical with respect to a line which passes through a center point of the parallel coupling region, which is vertical to the direction of an optical axis along which an inputted light propagates from the input port to the output port, and which is parallel to the substrate.

The at least one asymmetrical directional coupler may be so arranged that the at least two optical waveguides forming the coupling region including the parallel coupling region of the at least one directional coupler are substantially point symmetrical with respect to a center point of the coupling region.

The widths of the optical waveguides, which are different from each other partially in the parallel coupling region of the at least one directional coupler, may be so determined that the difference between the widths of the optical waveguides in the parallel coupling region of the at least one directional coupler and the widths of the input port and the output port does not exceed 90% of the widths of the input port and the output port.

The optical waveguide in the parallel coupling region of the at least one directional coupler may be so tapered that the at least one asymmetrical directional coupler and at least one symmetrical directional coupler are formed.

The substrate may be a silicon substrate and the at least two optical waveguides may be single-mode optical waveguides made of silica-based glass materials.

In the present invention, the widths and the depths of the two optical waveguides at both ends of the parallel coupling region are made equal to those of the optical waveguides at the input and output ports and the widths of the two optical waveguides in the parallel coupling region are made different from each other in at least one portion of the parallel coupling region, so that the wavelength dependence of the coupling ratio of the power between the input port and the output port is reduced in a specific wavelength range, for example, between 1.2 $\mu$m and 1.6 $\mu$m. As a result, the structure of the guided-wave optical branching device operating in a wide wavelength range wavelength in accordance with the present invention is different from that of the prior art guided-wave optical branching device in which the coupling region includes two optical waveguides having constant widths different from each other and which operate in a wide wavelength region.

In other words, the present invention provides a guidedwave optical branching device having only one directional coupling device and in which tapered structures of the waveguides in the coupling region are so designed that a propagation constant of each of the waveguides is partially varied and accordingly the entire coupling region has a reduced wavelength dependence, thereby operating in a desired wide wavelength range with a lower power loss. In the present invention, the overall shape of the coupling portion is formed to be a line symmetrical or point symmetrical configuration in order to improve manufacturing efficiency.

In addition, in the present invention, the power loss is reduced by making the widths and the depths of the curved portions of the optical waveguides equal to those of the input and the output ports without reducing the widths and the depths of the curved edge portions of the waveguides.

Furthermore, the widths of at least one portion of the waveguides in the coupling region are different from the widths of the input and output ports. It is preferable to set the width in such a way that a difference in width between the waveguides and the input and output ports does not exceed substantially 90% of the widths of the input and output ports in order to reduce the light power loss due to light wave scattering.

The guided-wave optical branching device of the present invention is expected to be used as a device for distributing, monitoring and tapping light signals over a wide wavelength range. A plurality of the optical branching devices of the present invention can be coupled in plural stages to thereby easily realize a four-output-port branching device, an eight-output-port branching device or a branching device with more output ports.

Furthermore, according to the present invention, a plurality of optical branching devices can be formed in an array geometry on a single substrate, and for example, it is possible to connect the array to an optical fiber array having optical fibers spaced at a pitch of 250 μm.

In the present invention, a gap g between the adjacent waveguides in the coupling region is set to be constant. This makes design of the device easier, but a configuration of an optical branching device in accordance with the present invention is not limited to such a constant gap. That is, a modification in which a gap between the waveguides in the coupling region is varied is within the spirit of the invention without losing the generic property of the invention, even though an actual designing of such a device is complicated.

The above and other objects, effects, features and advantages of the present invention will become more apparent from the following description of the embodiments thereof taken in conjunction with the accompanying drawings.

BRIEF DESCRIPTION OF THE DRAWINGS

Embodiments of the invention will now be described, by way of example and with reference to the accompanying drawings in which like parts are designated with like numerals throughout, and in which:

FIG. 20A is modified by exchanging the input port and the output port with each other;

DETAILED DESCRIPTION OF THE PREFERRED EMBODIMENTS

As will be described hereinafter, these and other features of the present invention and some embodiment thereof are more fully described below in the detailed description referring to the accompanying drawings.

Various embodiments of an optical directional coupler used in the present invention can be classified into three types with respect to the symmetry of their planar shapes, i.e., (1) tapered directional couplers formed in a line symmetry, (2) tapered directional couplers formed neither in a line symmetry nor in a point symmetry, and (3) tapered directional couplers formed in a point symmetry. In the following description, various embodiments of these three types of tapered directional couplers will be disclosed in detail in this sequence.

Further, in the following embodiments of the present invention, a silicon substrate is used for a substrate 1, and optical waveguides formed on the silicon substrate 1 and made of silica glass materials are used for optical waveguides 1a and 1b. This is because a single-mode waveguide formed with silica glass material has good matching with a single-mode optical fiber and can provide a practical optical guided-wave branching device. It is to be noted that an optical waveguide used in the present invention is not limited to silica glass material. For example, silica glass, ceramics, crystalline materials such as semiconductors and $LiNbO_3$ may be used as the substrate material and semiconductor material, organic compounds, dielectric material and ceramics may be used as the waveguide material.

Embodiment Group A

In embodiment group A, explanation will be made of embodiments of the present invention with respect to a guided-wave optical branching device available in a wide wavelength range where the shape of the entire directional coupler is formed to be a line symmetrical structure.

Figure 1:
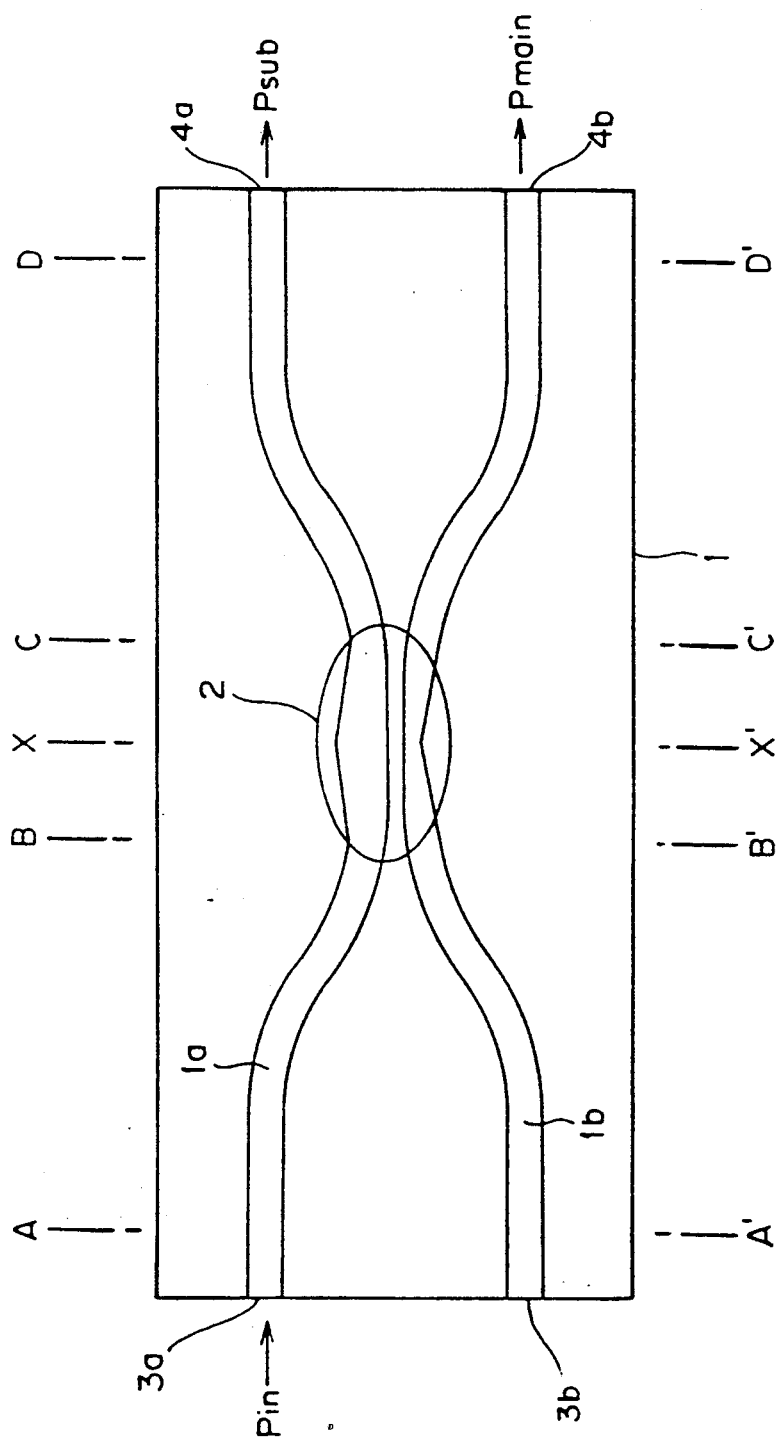
FIG. 1 is an enlarged plan view showing a basic structure of a line symmetrical tapered directional coupler of an embodiment group A of the present invention.
Figure 2A:
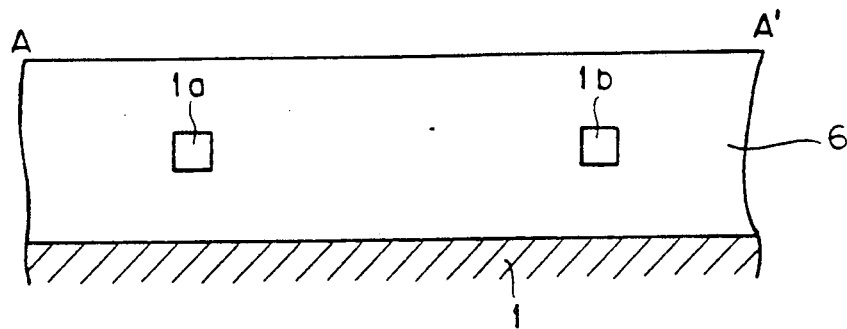
FIGS. 2A, 2B and 2C are cross sectional views showing the line symmetrical tapered directional coupler shown in FIG. 1, taken along line AA' line BB' (also CC') and line DD', respectively.
Figure 2B:
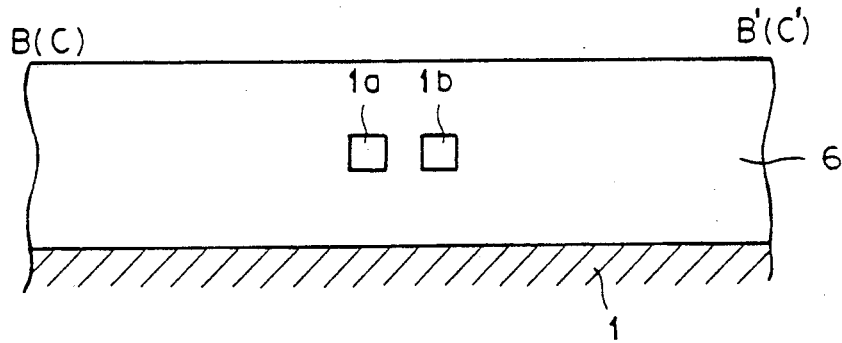
Figure 2C:
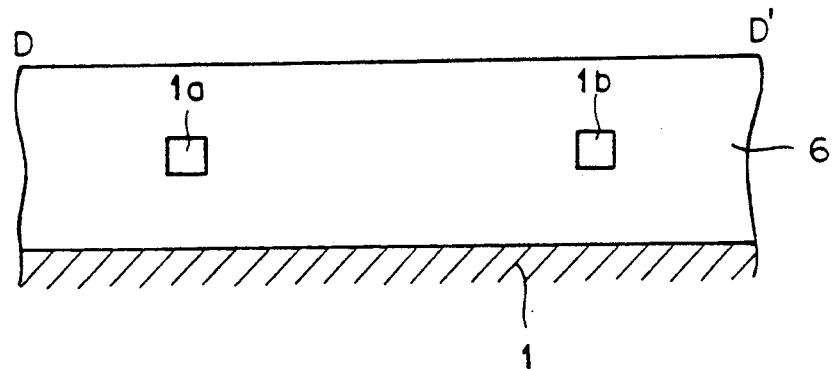

FIG. 1 and FIGS. 2A, 2B and 2C show a basic structure of a guided-wave optical branching device available in a wide wavelength range where the shape of the overall directional coupler is formed to be a line symmetrical structure. Figs. 2A, 2B and 2C are magnified cross sectional views taken along lines AA', BB' (also CC') and DD', respectively. Here, optical waveguides 1a and 1b are disposed on a planar substrate 1. A portion 2 forming a tapered directional coupler is provided by bringing these two waveguides 1a and 1b into close proximity to each other at one position, while gradually varying the widths of the waveguides 1a and 1b within the directional coupler. As shown in FIGS. 2A, 2B and 2C, the widths and the depths of the waveguides 1a and 1b on both sides of the tapered directional coupler 2, i.e., at the positions of cross-sectional lines AA', BB', CC' and DD' are equal to one another, respectively.

Ends 3a and 3b of the optical waveguides 1a and 1b, respectively, serve as input ports of the tapered directional coupler 2 and the other ends 4a and 4b of the optical waveguides 1a and 1b serve as sub output port and a main output port, respectively. Pin is an input light guided to the input port 3a. Pmain and Psub are a main output light and a sub output light obtained from the main output port 4b and the sub output port 4a, respectively.

As one embodiment of the tapered directional coupler 2 shown in FIG. 1 and FIGS. 2A, 2B and 2C, a tapered directional coupler formed in a line symmetry as shown in FIG. 3 and FIGS. 4A, 4B and 4C will be further described in detail.

Figure 3:
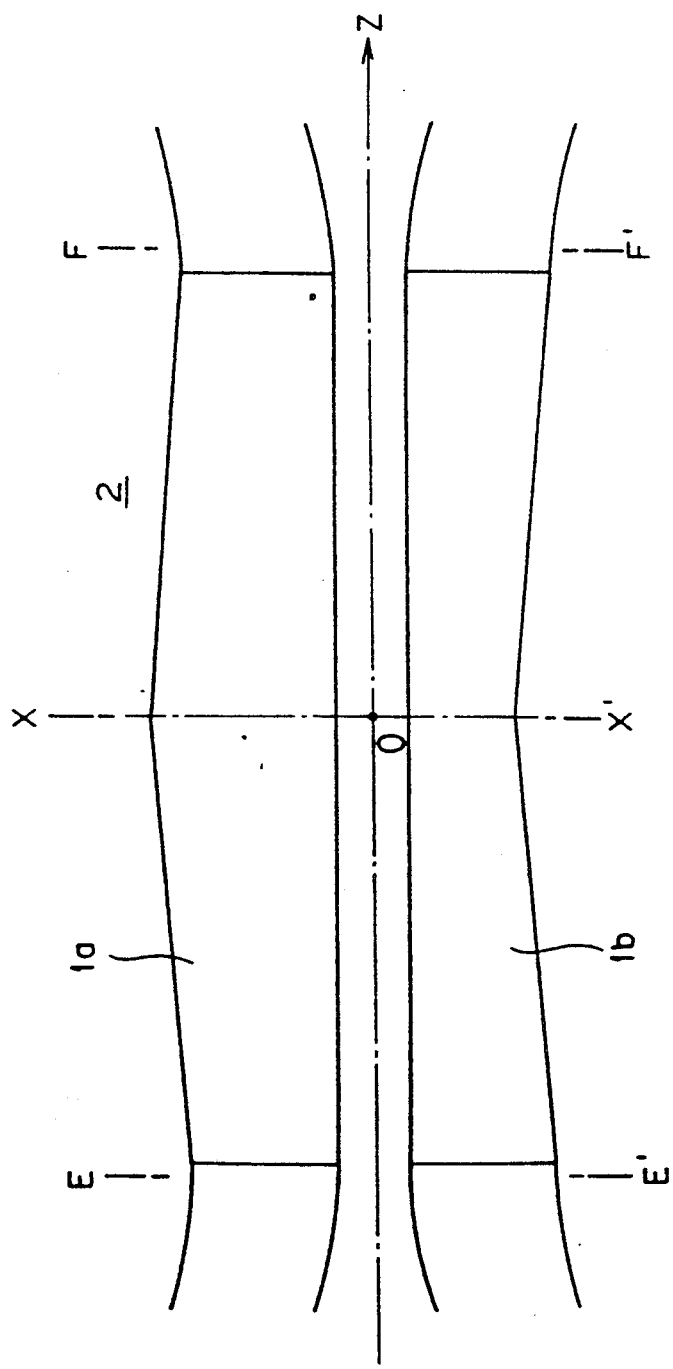
FIG. 3 is an enlarged plan view showing the line symmetrical tapered directional coupler 2 of the present invention shown in FIG. 1.
Figure 4A:
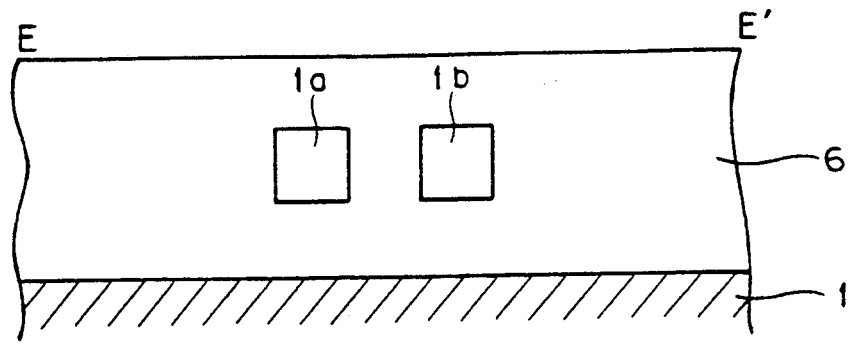
FIGS. 4A, 4B, and 4C are cross sectional views of the line symmetrical tapered directional coupler shown in FIG. 1, taken along line EE', line XX' and line FF', respectively.
Figure 4B:
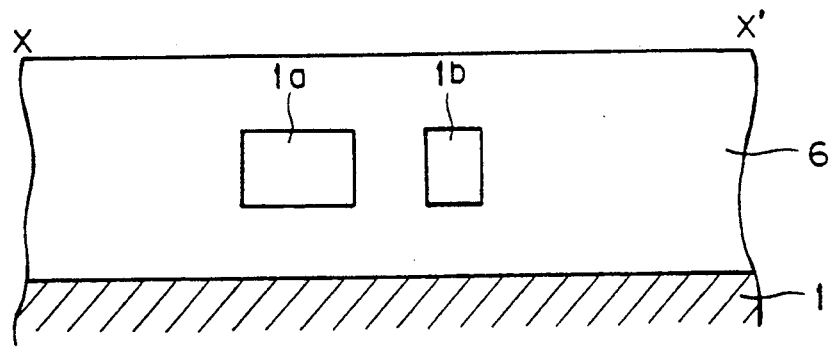
Figure 4C:
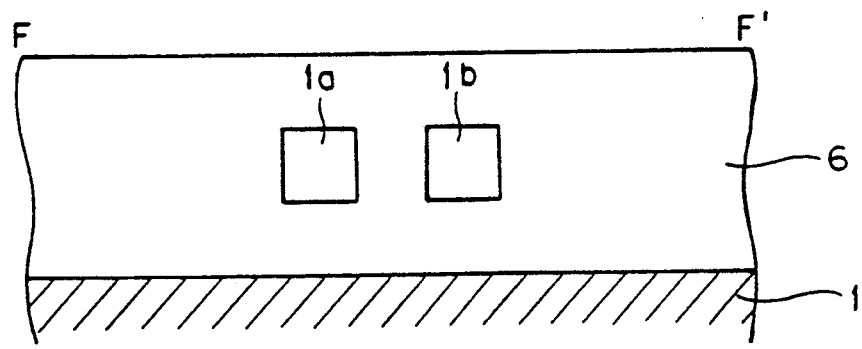

FIG. 3 and FIGS. 4A, 4B and 4C are an enlarged plan view and enlarged cross sectional views showing a portion of a line symmetrical tapered directional coupler which is an important component of the embodiments comprising embodiment group A of the present invention shown in FIG. 1 and Figs. 2A, 2B and 2C, respectively. As seen in FIGS. 4A to 4C, the waveguide 1a and 1b have a square cross section having the same size at lines EE' and FF', and have rectangular cross sections at line XX'. The width of one of the waveguides at line XX' is wider than the widths of the square cross sections at lines EE' and FF', while the width of the other waveguide at line XX' is narrower than the widths of the square cross sections at lines EE' and FF', and both the widths at line XX40 are different from each other. At various locations between lines EE' and XX' and between lines XX' and FF', rectangular cross sections of the waveguides 1a and 1b vary linearly to have intermediate shapes between the cross sections at lines EE' and XX' and lines XX' and FF', respectively. The shape of the rectangular cross sections formed by the waveguides 1a and 1b are symmetrical with respect to line XX', which is perpendicular to an optical axis direction Z crossing the center O (the origin) of the entire coupler 2, and accordingly this coupler is referred to as a line symmetrical tapered directional coupler.

The waveguides 1a and 1b are composed of, for example, $SiO_2$- $TiO_2$ based glass core portions having a cross section of about 8 $\mu m \times 8$ $\mu m$, and embedded in a clad layer 6 made of $SiO_2$ based glass having a thickness of about 50 $\mu m$. Their circuit pattern is formed by the combination of a straight pattern and a circular arc pattern having a curvature radius of 50 mm. This kind of silica glass optical waveguides 1a and 1b can be formed by combining known technologies of a glass film deposition process using the flame hydrolysis reaction of silicon tetrachloride ($SiCl_4$) or titanium tetrachloride ($TiCl_4$) and a fine patterning process using reactive ion etching.

Next, the wavelength dependence of the output light from the above-mentioned line symmetrical tapered directional coupler will be explained.

Figure 5:
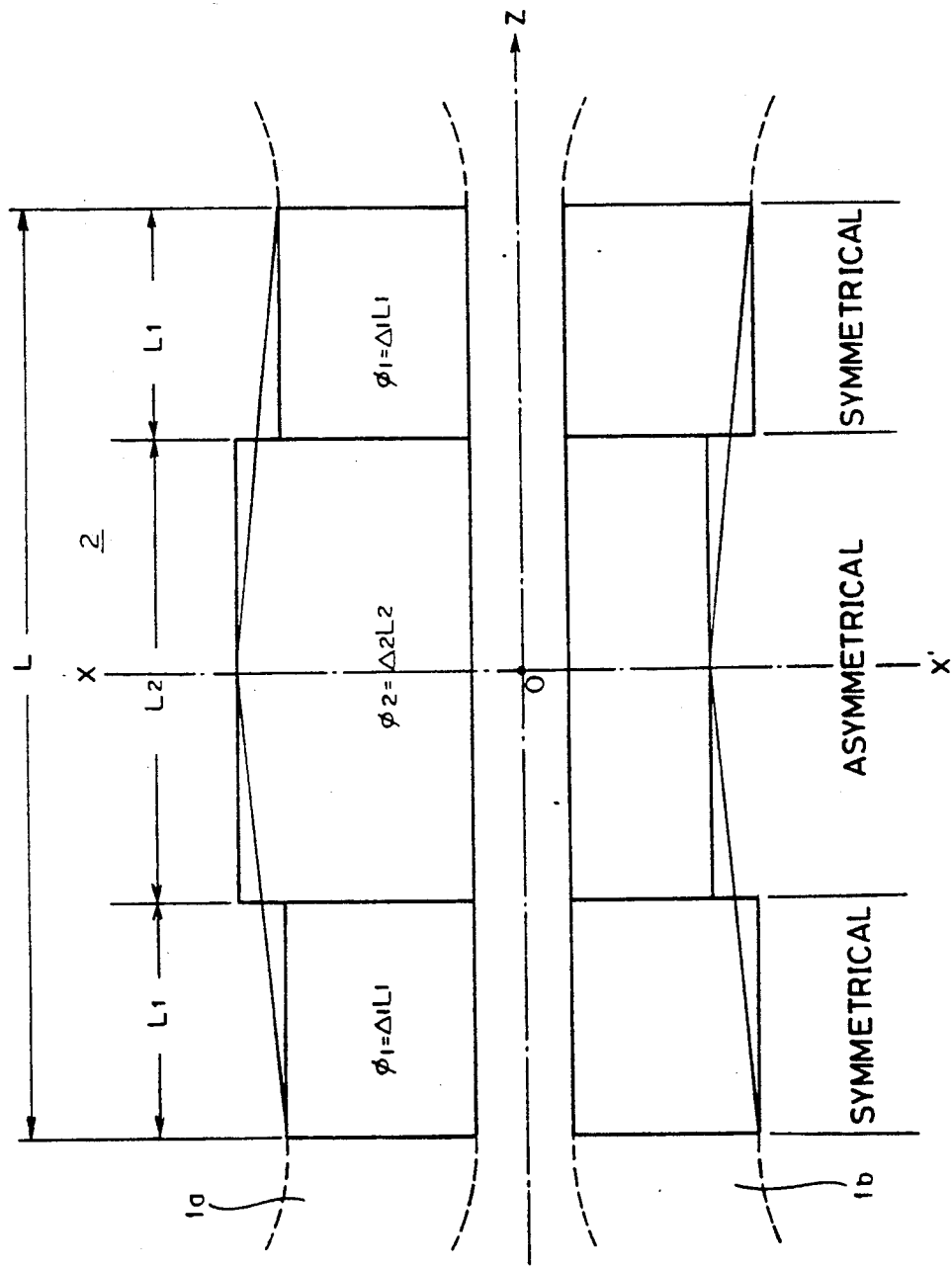
FIG. 5 is an explanatory schematic diagram for analyzing the line symmetrical tapered directional coupler shown in FIG. 1.

The line symmetrical tapered directional coupler 2 as shown in FIG. 3 can be equivalent to a cascade connection of two symmetrical directional couplers and a single asymmetrical directional coupler, as shown in FIG. 5. While it is possible to divide the directional coupler into smaller segments, the example shown in FIG. 5 uses three segments for the sake of simplicity.

Output power (A, B) from the two output ports of the asymmetrical directional coupler which is composed of isotropic and loss-free media relative to input power (U, V) from the two input ports is given by the following equation according to the coupled mode theory which is described in detail on page 51 in "Optical Integrated Circuit", 1st ed. in Japanese by Hiroshi Nisihara et al. published by Ohm-sha, Feb. 25, 1985.

In the following Equation (1), U denotes input power to the input port 3a. V denotes input power to the input port 3b. A denotes output power from the output port 4a and B denotes output power from the output port 4b.

[Equation (1)]

$$\begin{pmatrix} A \\ B \end{pmatrix} = \begin{pmatrix} \cos \Delta Z - j \cdot R\sin \Delta Z & -j \cdot S\sin \Delta Z \\ -j \cdot S\sin \Delta Z & \cos \Delta Z + j \cdot R\sin \Delta Z \end{pmatrix} \cdot \begin{pmatrix} U \\ V \end{pmatrix} \quad (1)$$

where
$$R = (\beta a - \beta b)/2\Delta \quad (2)$$
$$S = \kappa/\Delta \quad (3)$$

$$\Delta = \sqrt{(\beta a - \beta b)^2/4 + \kappa^2} \quad (4)$$

In equation (4), $\beta$ a and $\beta$ b denote propagation constants specific to the respective waveguides 1a and 1b, and R and S are parameters representing the degree of asymmetry of the waveguide layout and having a relationship such as $R^2 + S^2 = 1$ where $$0 <= R < 1 \text{ and } 0 \leq S <= 1.$$

If $\beta$ a $= \beta$ b, then R=0 and S=1. The output power (A, B) relative to the input power (U, V) is given by the following Equation (5).

$$\begin{pmatrix} A \\ B \end{pmatrix} = \begin{pmatrix} \cos \kappa Z & -j \cdot \sin \kappa Z \\ -j \cdot \sin \kappa Z & \cos \kappa Z \end{pmatrix} \cdot \begin{pmatrix} U \\ V \end{pmatrix} \quad (5)$$

where j is the imaginary unit, $\kappa$ is a coupling coefficient and Z is the propagation distance.

The output power (A, B) from the line symmetrical tapered directional coupler shown in FIG. 5 is given by multiplying coefficient matrices corresponding to the two symmetrical directional couplers and the single asymmetrical directional coupler. Both the coefficient matrices are found in Equations (1) and (5).

Thus, the output power (A, B) is expressed as follows.

$$\begin{pmatrix} A \\ B \end{pmatrix} = \begin{pmatrix} \cos \phi_1 & -j \cdot \sin \phi_1 \\ -j \cdot \sin \phi_1 & \cos \phi_1 \end{pmatrix} \cdot \quad (6)$$

$$\begin{pmatrix} \cos \phi_2 - j \cdot R\sin \phi_2 & -j \cdot S\sin \phi_2 \\ -j \cdot S\sin \phi_2 & \cos \phi_2 + j \cdot R\sin \phi_2 \end{pmatrix} \cdot$$

$$\begin{pmatrix} \cos \phi_1 & -j \cdot \sin \phi_1 \\ -j \cdot \sin \phi_1 & \cos \phi_1 \end{pmatrix} \begin{pmatrix} U \\ V \end{pmatrix}$$

The coefficient matrix represented by Equation (6) is referred to as $M_1$. $M_1$ can be written as expressed by Equation (7).

$$M_1 = \begin{pmatrix} a_1 & b_1 \\ c_1 & d_1 \end{pmatrix} = \quad (7)$$

-continued $$\begin{pmatrix} m_1 - jn_1 & -jq_1(\text{Pure Imaginary}) \\ -jq_1(\text{Pure Imaginary}) & m_1 + jn_1 \end{pmatrix},$$

where $$m1 = \cos\phi_2 \cdot \cos(2\cdot\phi_1) - S\cdot\sin\phi_2\cdot\sin(2\cdot\phi_1) \tag{8}$$

$$n1 = R\cdot\sin(\phi_2) \tag{9}$$

and $$q1 = S\cdot\sin\phi_2\cdot\cos(2\cdot\phi_1) + \cos\phi_2\cdot\sin(2\cdot\phi_1) \tag{10}$$

Accordingly, the output power of the line symmetrical tapered directional coupler known in FIG. 5 is expressed by the following Equations (11) and (12).

$$P_1 \text{ (through)} = m_1{}^2 + n_1{}^2 = \{\cos\phi_2 \cdot \cos(2\cdot\phi_1) - \tag{11}$$

$$S \cdot \sin\phi_2 \cdot \sin(2 \cdot \phi_1)\}^2 + R^2 \cdot \sin^2\phi_2 = 1 - P_2$$

$$P_2 \text{ (cross)} = q_1{}^2 \tag{12}$$

$$= \{S \cdot \sin\phi_2 \cdot \cos(2 \cdot \phi_1) + \cos\phi_2 \cdot \sin(2 \cdot \phi_1)\}^2,$$

where $$\left.\begin{array}{l}\phi_1 = \kappa \cdot L_1 \\ \phi_2 = \Delta_2 \cdot L_2 \\ = \sqrt{(\beta a - \beta b)^2/4 + \kappa^2} \cdot L_2\end{array}\right\} \tag{13}$$

Figure 38:
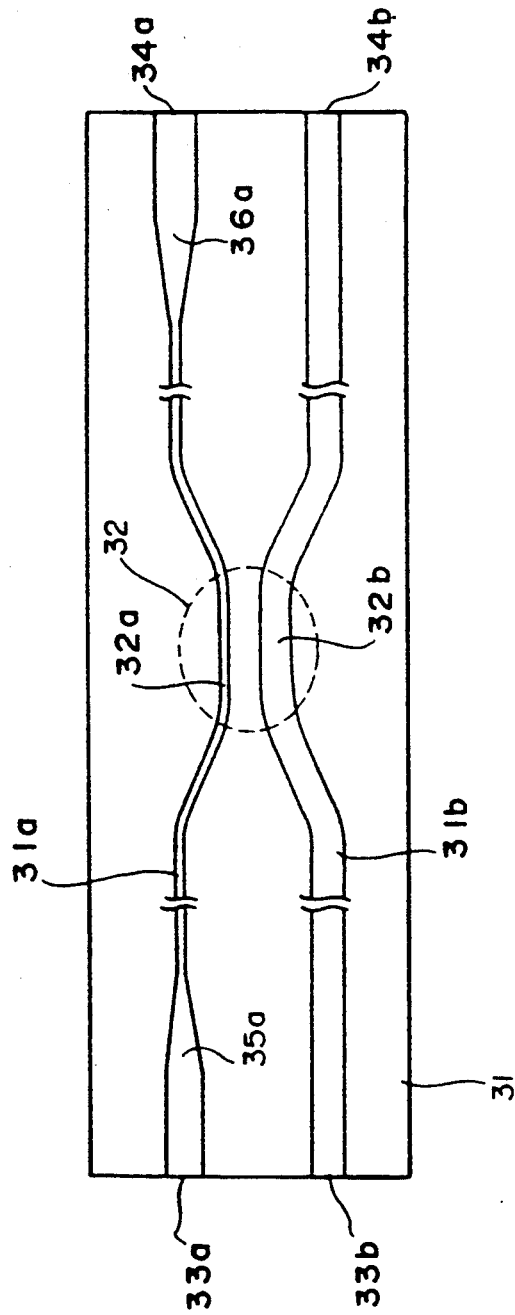
FIG. 38 is a plan view showing an example of a second prior art guided-wave optical branching device (prior art 2)
Figure 39:
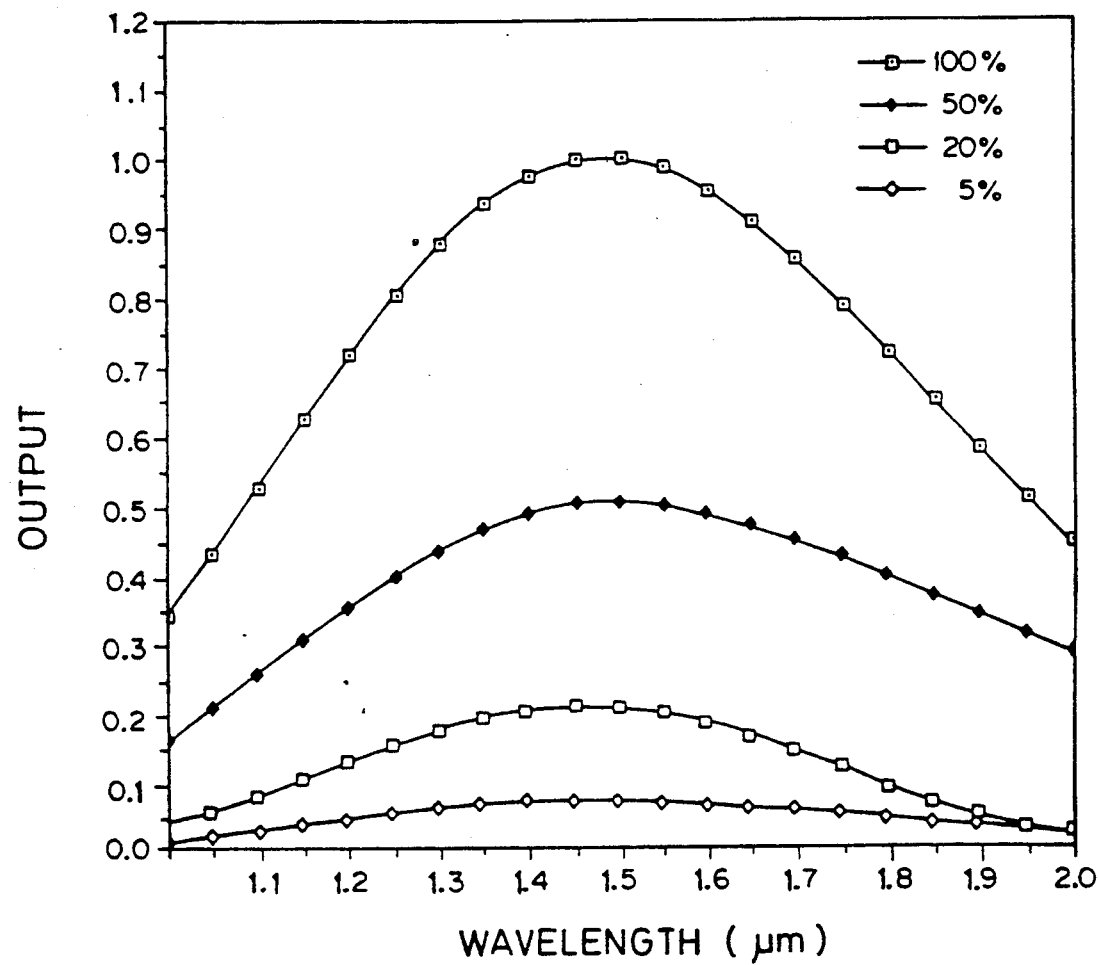
FIG. 39 illustrates the wavelength dependence characteristics of the coupling ratio of the prior art symmetrical directional coupler (prior art 2).

By selecting appropriate values for S, (2·101 1) and Φ2 and calculating in accordance with Equation (12), an optical branching device available in the wide wavelengths range which is similar to the prior art 2 illustrated in FIG. 38 can be provided. In other words, in the line symmetrical tapered directional coupler as shown in FIG. 5, the widths and the depths of the waveguides at both ends of the parallel coupling region having a length L can be made identical to those of the waveguides at the input port and the output port so that the frequency characteristics in the wide wavelength range as in the case of prior art 2 can be attained. In the following, specific embodiments of the optical branching device available in a wide wavelength range will be described.

While it is effective to use matrix calculus in order to analyze the overall frequency characteristics of an optical branching device, this analysis only treats a coupling region excluding bent o curved waveguide segments of the optical branching device, so that there is a problem in the accuracy of the analysis in designing an actual optical branching device. In order to overcome this problem, there is proposed a computer simulation based on a beam propagation method, for example, found on page 308 in "Fundamental Analytical Method for Electromagnetic Wave Problems" in Japanese, edited by Eikichi Yamashita, published by the Institute of Electronics, Information and Communication Engineers, Oct. 30, 1987. In this method, an electromagnetic component of a propagating wave in the direction vertical to the propagating direction is subject to discrete Fourier transformation (DFT) and the DFT calculation is processed sequentially at every small interval in the propagation direction. This method is suitable for a numerical analysis of a light wave propagating in an optical circuit in the form of a waveguide. If the rough structure of an optical branching device is grasped, its frequency characteristics can be estimated substantially accurately by means of the beam propagation method. It is noted that the values of various parameters used in the matrix calculus of embodiments of the present invention are not necessarily defined exactly.

Embodiment 1

Figure 6A:
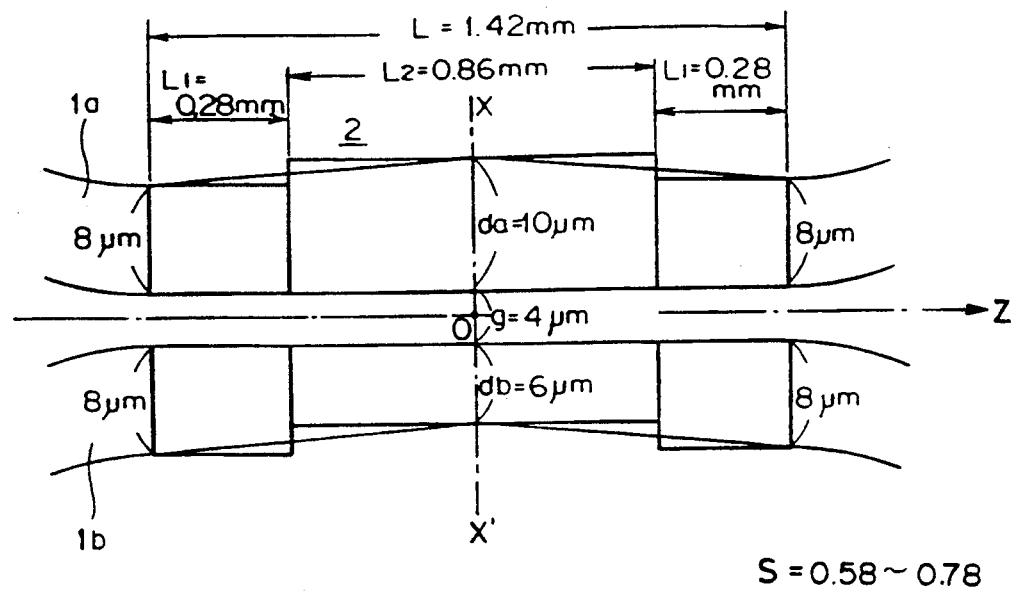
FIG. 6A is a plan view showing a structure of the first embodiment of a guided-wave optical branching device in accordance with the present invention.

FIG. 6A shows the first embodiment of a guided-wave optical branching device in accordance with the present invention. The structure of the optical branching device was designed so that the device had a coupling ratio of 50%±4% in the wavelength range of $\lambda 1 = 1.2$ μm to $\lambda 2 = 1.6$ μm.

In the configuration shown in FIG. 6A, the waveguides 1a and 1b were so placed that the gap g between the waveguides 1a and 1b was set to be 4.0 μm corresponding to the parameter S between 0.58 and 0.78, and the length L of the coupling region of the waveguides 1a and 1b was set to be 1.42 mm. Furthermore, lengths L1 and L2 of the segmented coupling regions were set to be 0.28 mm and 0.86 mm, respectively, in such a way that the overall shape of the coupling portion 2 was line symmetrical with respect to the X axis. In addition, in the process of fabricating a photo mask pattern, maximum width da of the waveguides 1a and 1b was determined to be 10 μm and the minimum width db of the waveguides 1a and 1b was determined to be 6 μm. The distance between the input ports 3a and 3b was set to be 0.250 mm and the distance between the output ports 4a and 4b was set to be 0.250 mm. The port width of each of the input ports 3a and 3b was set to be 8 μm. The port width of each of the output ports 4a and 4b was set to be 8 μm.

Figure 6B:
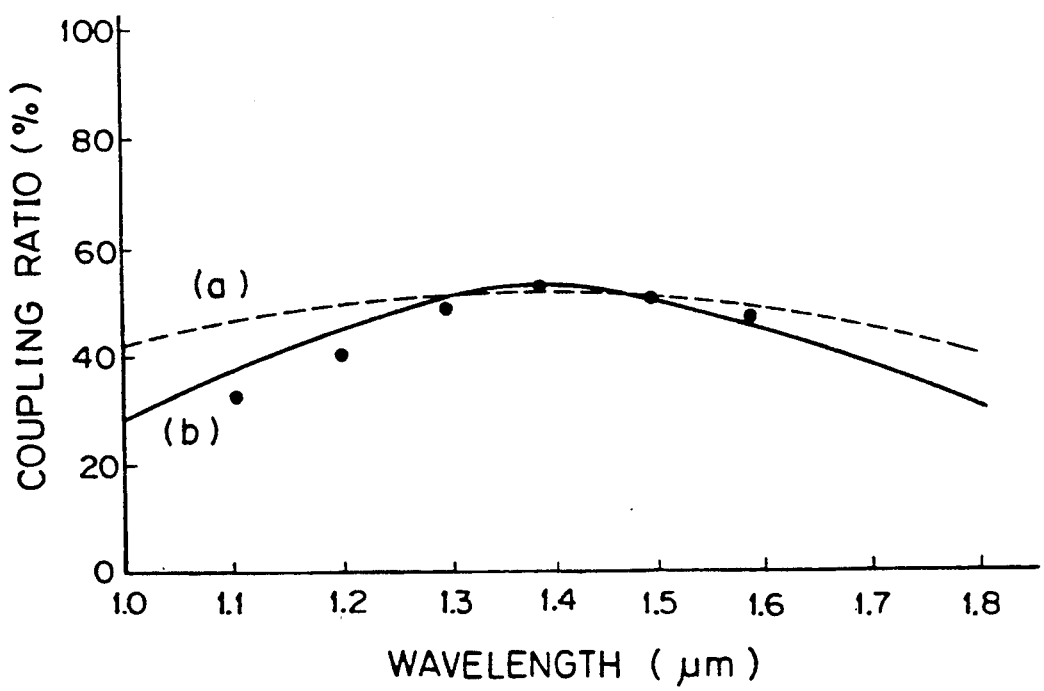
FIG. 6B illustrates the wavelength dependence characteristic of the coupling ratio in the optical branching device of the first embodiment.

FIG. 6B illustrates the wavelength dependence of the coupling ratio with respect to the optical branching device of the first embodiment of the present invention. The broken line (a) in FIG. 6B corresponds to the calculation result obtained from Equation (12). As seen from FIG. 6B, the coupling ratio was 50%±3% in the wavelength range between $\lambda 1 = 1.2$ μm and $\lambda 2 = 1.6$ μm and thus wide range frequency characteristics can be established.

In contrast, the solid line (b) in FIG. 6B corresponds to a calculation result with a higher accuracy based on the beam propagation method as described earlier. Solid dots are plotted to illustrate experimental results. While flat characteristics of the coupling ratio were rather deteriorated in a shorter wavelength range not exceeding 1.2 μm and also in a longer wavelength range exceeding 1.6 μm, flat characteristics of 50%±4% of the coupling ratio can be established in a range between 1.3 μm and 1.6 μm. This means that the calculated results well coincide with the experimental results.

The power loss in the overall optical branching device was sufficiently small and less than 0.2 dB. In the first embodiment of the present invention of an optical branching device, the flatness of the coupling ratio characteristics is enhanced in comparison with the prior art 2, and the input power loss is remarkably reduced. Therefore, a practical guided-wave optical branching device of a wide wavelength range operation type can be provided by the present invention.

Embodiment 2

Figure 7A:
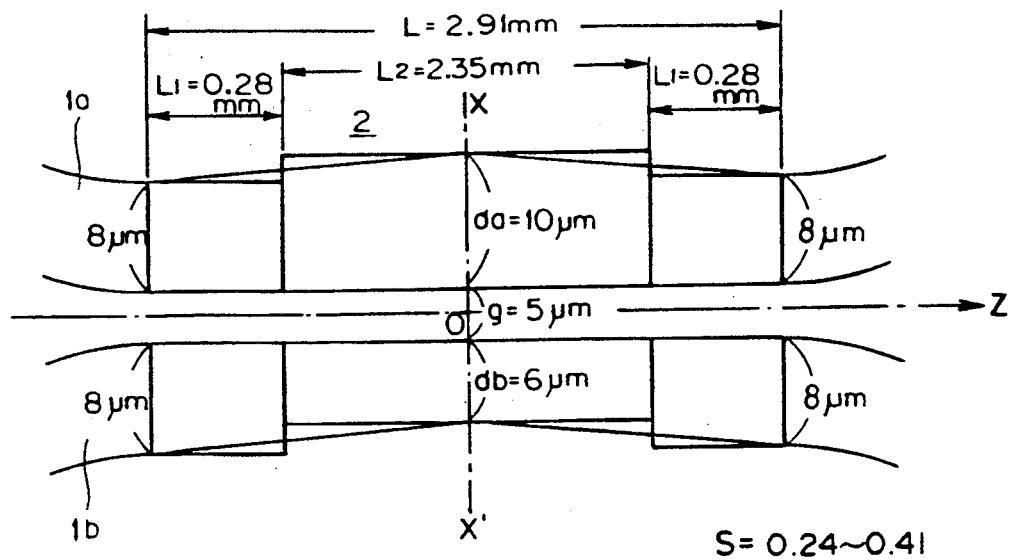
FIG. 7A is a plan view showing a structure of the second embodiment of a guided-wave optical branching device in accordance with the present invention.

FIG. 7A shows the second embodiment of a guided-wave optical branching device in accordance with the present invention. The structure of the optical branching device was designed so that the device had a coupling ratio of 20%±2% in the wavelength range of λ1=1.1 μm to λ2=1.65 μm.

In the configuration shown in FIG. 7A, the waveguides 1a and 1b were so placed that the gap g between the waveguides 1a and 1b was set to be 5.0 μm corresponding to the parameter S between 0.24 and 0.41, and the length L of the coupling region of the waveguides 1a and 1b was set to be 2.91 mm. Furthermore, lengths L1 and L2 of the segmented coupling regions were set to be 0.28 mm and 2.35 mm, respectively, in such a way that the overall shape of the coupling portion 2 was line symmetrical with respect to the X axis. In addition, in the process of fabricating a photo mask pattern, the maximum width da of the waveguides 1a and 1b was determined to be 10 μm and the minimum width db of the waveguides 1a and 1b was determined to be 6 μm. The distance between the input ports 3a and 3b was set to be 0.250 mm and the distance between the output ports 4a and 4b was set to be 0.250 mm. The port width of each of the input ports 3a and 3b was set to be 8 μm. The port width of each of the output ports 4a and 4b was set to be 8 μm.

Figure 7B:
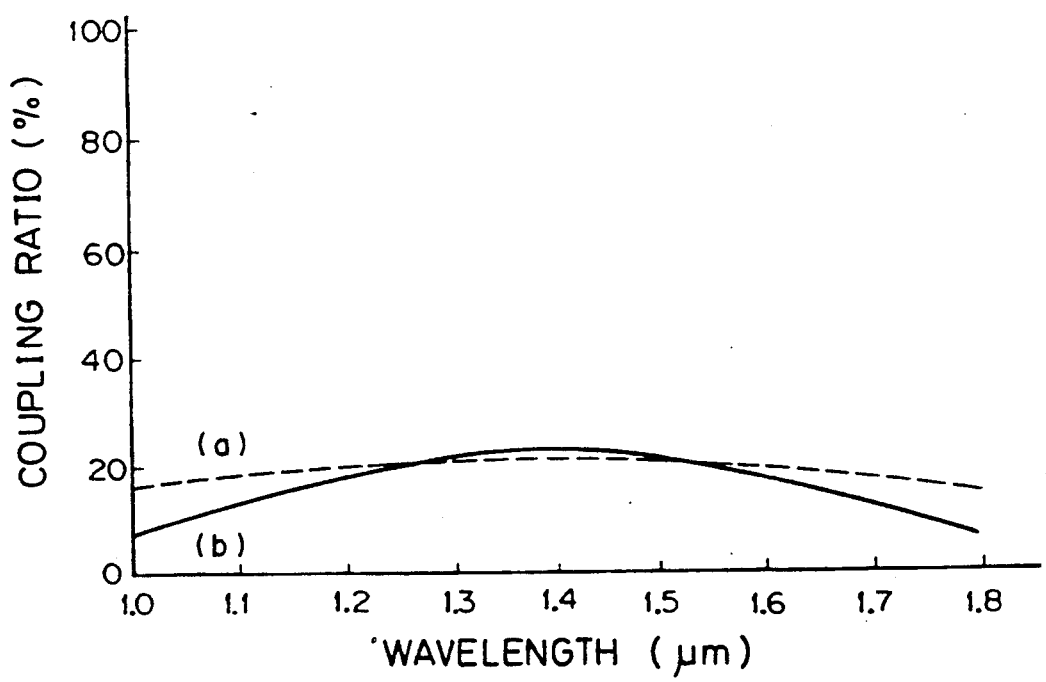
FIG. 7B illustrates the wavelength dependence characteristic of the coupling ratio in the optical branching device of the second embodiment.

FIG. 7B illustrates the wavelength dependence of the coupling ratio with respect to the optical branching device of the second embodiment of the present invention. The broken line (a) in FIG. 7B corresponds to the calculation result obtained from Equation (12). As seen from FIG. 7B, the coupling ratio was 20%±1% in the wavelength range between λ1=1.1 μm and λ2=1.65 μm and thus wide range frequency characteristics can be established.

In contrast, the solid line (b) in FIG. 7B corresponds to a calculation result with a higher accuracy based on the beam propagation method as described earlier. While flat characteristics of the coupling ratio were rather deteriorated in a shorter wavelength range not exceeding 1.2 μm and also in a longer wavelength range exceeding 1.65 μm, flat characteristics of 20%±2% of the coupling ratio can be established in the range between 1.3 μm and 1.6 μm.

The power loss in the overall optical branching device was sufficiently small and less than 0.2 dB. In the second embodiment of the present invention of an optical branching device, the flatness of the coupling ratio characteristics is enhanced in comparison with the prior art 2, and the input power loss is remarkably reduced, and therefore, a practical guided-wave optical branching device of a wide wavelength range operation type can be provided by the present invention.

Embodiment 3

Figure 8A:
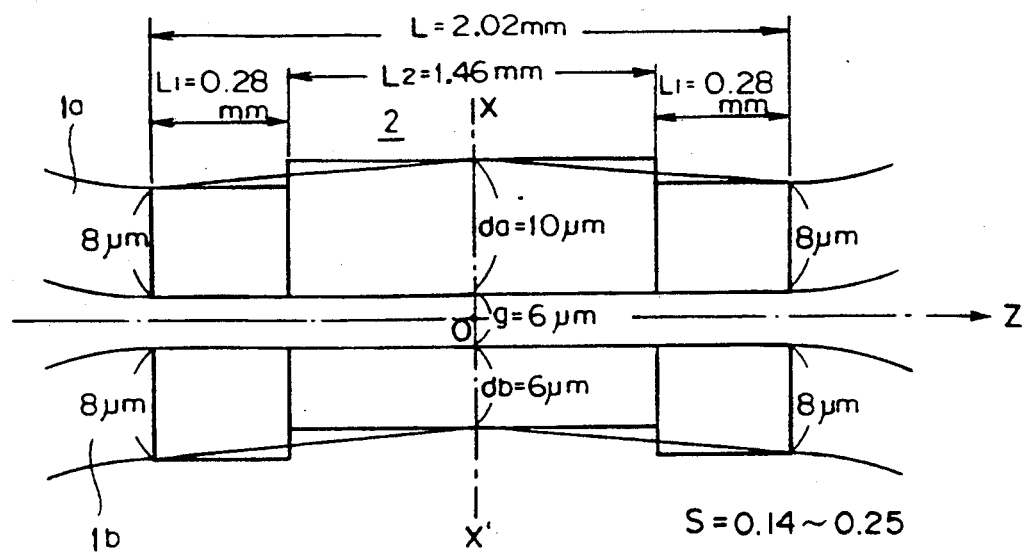
FIG. 8A is a plan view showing a structure of a third embodiment of a guided-wave optical branch device in accodance with the present invention.

FIG. 8A shows the third embodiment of a guided-wave optical branching device in accordance with the present invention. The structure of the optical branching device was designed so that the device had a coupling ratio of 5%±1% in the wavelength range of λ1=1.1 μm to λ2=1.7 μm.

In the configuration shown in FIG. 8A, the waveguides 1a and 1b were so placed that the gap g between the waveguides 1a and 1b was set to be 6.0 μm corresponding to the parameter S between 0.14 and 0.25, and the length L of the coupling region of the waveguides 1a and 1b was set to be 2.02 mm. Furthermore, lengths L1 and L2 of the segmented coupling regions were set to be 0.28 mm and 1.46 mm, respectively, in such a way that the overall shape of the coupling portion 2 was line symmetrical with respect to the X axis. In addition, in the process of fabricating a photo mask pattern, the maximum width da of the waveguides 1a and 1b was determined to be 10 μm and the minimum width db of the waveguides 1a and 1b was determined to be 6 μm. The distance between the input ports 3a and 3b was set to be 0.250 mm and the distance between the output ports 4a and 4b was set to be 0.250 mm. The port width of each of the 3b was set to be 8 μm. The port width of each of the output ports 4a and 4b was set to be 8 μm.

Figure 8B:
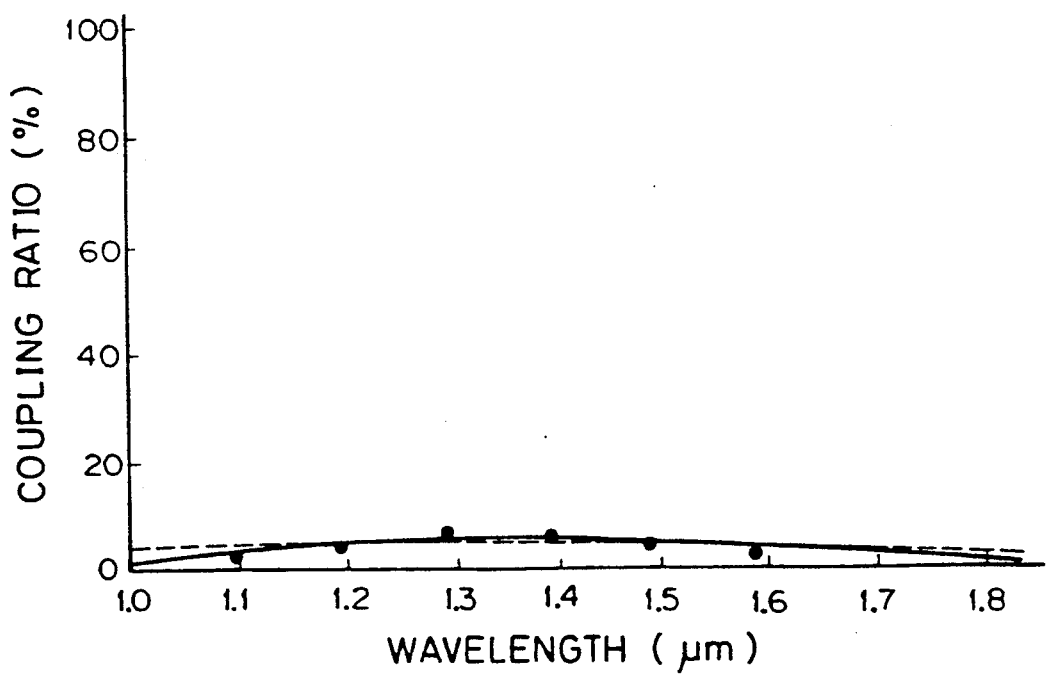
FIG. 8B illustrates the wavelength dependence characteristics of the coupling ratio in the optical branching device of the third embodiment.

FIG. 8B illustrates the wavelength dependence of the coupling ratio with respect to the optical branching device of the third embodiment of the present invention. The broken line (a) in FIG. 8B corresponds to the calculation result obtained from Equation (12). As seen from FIG. 8B, the coupling ratio was 5%±0.5% in the wavelength range between λ1=1.1 μm and λ2=1.7 μm and thus a wide range frequency characteristics can be established.

In contrast, the solid line (b) in FIG. 8B corresponds to a calculation result with a higher accuracy based on the beam propagation method as described earlier. Solid dots are plotted to illustrate experimental results. While flat characteristics of the coupling ratio were rather deteriorate in a shorter wavelength range not exceeding 1.2 μm and also in a longer wavelength range exceeding 1.6 μm, flat characteristics of 50%±1% of the coupling ratio can be established in a range between 1.3 μm and 1.6 μm. This means that the calculated results well coincide with the experimental results.

The power loss in the overall optical branching device was sufficiently small and less than 0.2 dB. In the third embodiment of the present invention of an optical branching device, the flatness of the coupling ratio characteristics is enhanced in comparison with the prior art 2, and the input power loss is remarkably reduced. Therefore, a practical guided-wave optical branching device of a wide wavelength range operation type can be provided by the present invention.

In the above-mentioned embodiment group A of the present invention, any desired and substantially constant coupling ratio can be established in a desired range of wavelength and a practical guided-wave optical branching device having a wide wavelength range and a reduced overall power loss can be provided. The frequency characteristics of the line symmetrical tapered directional coupler of the present invention is less influenced by fabrication process deviations than the guided-wave optical branching device of the prior art 2 described earlier and designing the device of the present invention is relatively easy compared to designing the prior art 2 device.

Figure 9A:
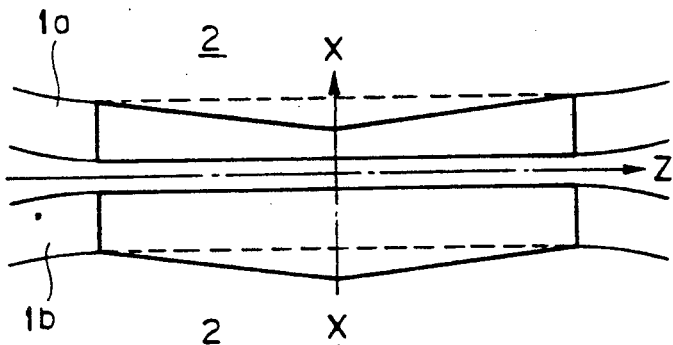
Figs. 9A, 9B, 9C and 9D are schematic diagrams showing embodiment of a line symmetrical tapered directional coupler of the present invention.
Figure 9B:
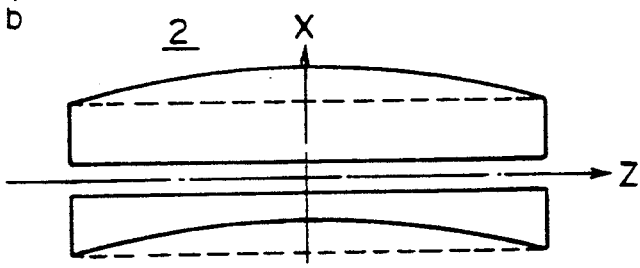
Figure 9C:
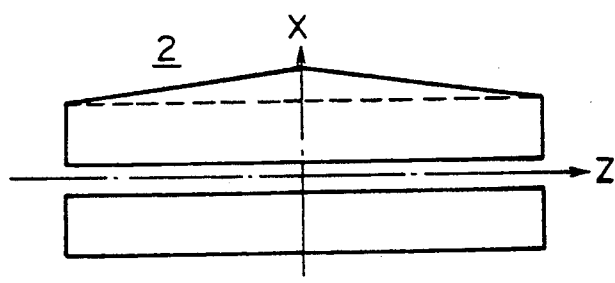
Figure 9D:
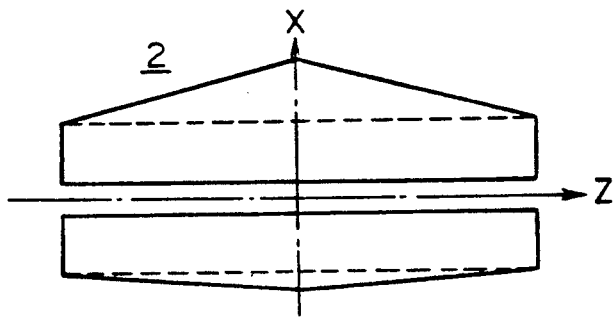
Figure 10A:
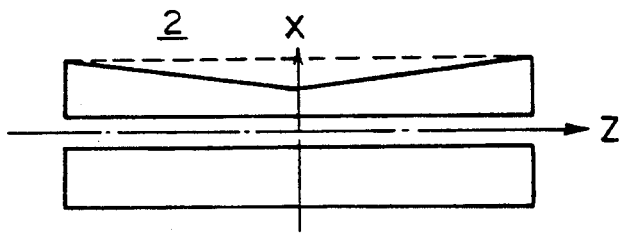
FIGS. 10A, 10B and 10C are schematic diagrams showing embodiments of a line symmetrical tapered directional coupler of the present invention.
Figure 10B:
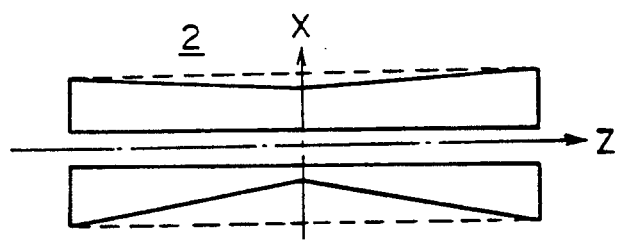
Figure 10C:
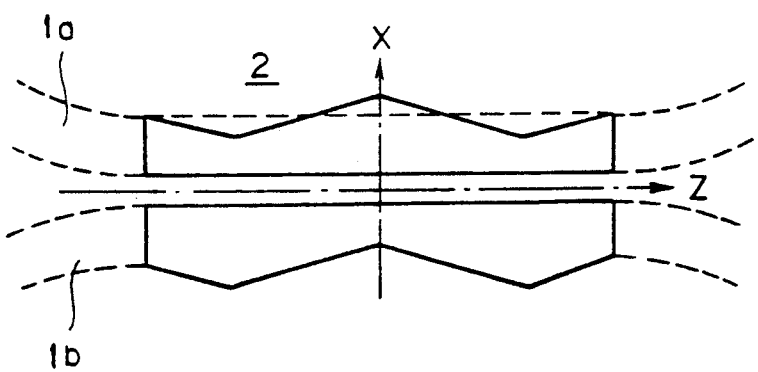
Figure 11A:
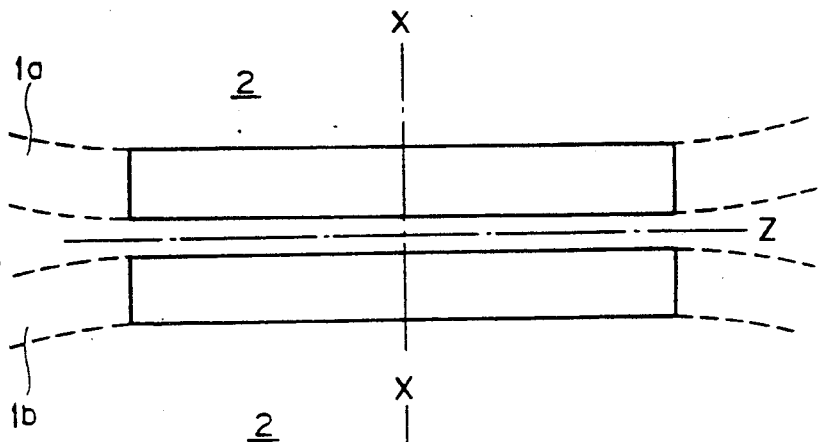
Figs. 11A, 11B and 11C are schematic diagrams showing embodiments of a line symmetrical tapered directional coupler excluded from the present invention.
Figure 11B:
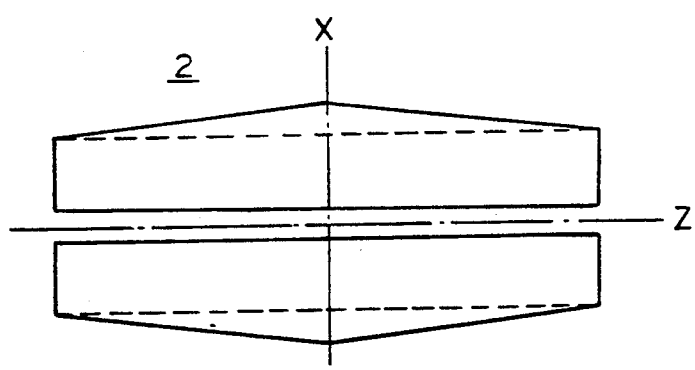
Figure 11C:
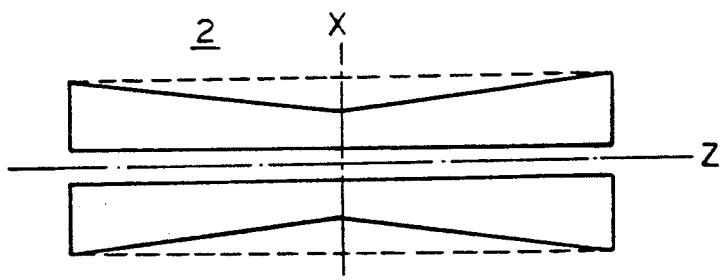
Figure 12A:
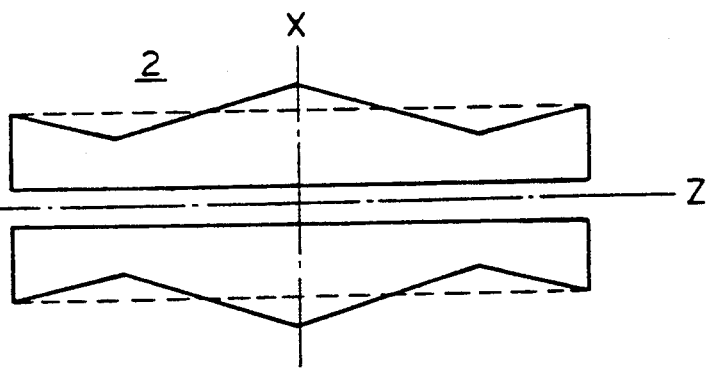
FIGS. 12A and 12B are schematic diagrams showing embodiments of a line symmetrical tapered directional coupler excluded from the present invention.
Figure 12B:
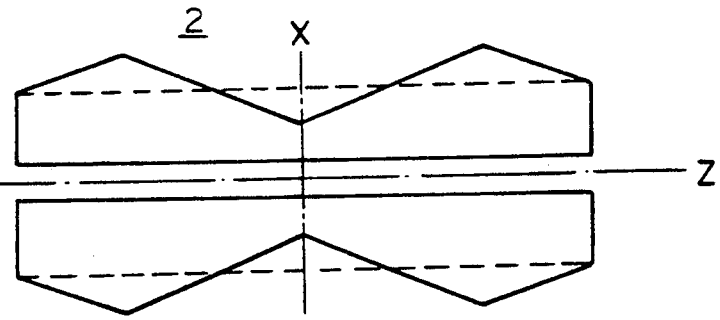

There are possible modifications of the line symmetrical tapered directional coupler 2 with respect to the embodiment group A as described above. For example, as shown in FIG. 9A, the waveguides 1a and 1b may be replaced with each other. Alternatively, as shown in FIG. 9B, the shape of the coupling portion may be smoothly and continuously curved. Furthermore, various kinds of tapered directional couplers may be formed within the scope of the present invention such as those shown in FIG. 9C or 9D or FIG. 10A, 10B or 10C.

In general, a directional coupler is a very sensitive optical circuit device in terms of its structure. Thus, a manufacturer can modify various parameters in consideration of the inherent nature of the various processing steps. In other words, it is sufficient that Equation (12) is examined in the respective embodiments to determine the coupling region lengths L1 and L2, the asymmetry parameter S and so on.

When there are a plurality of tapered waveguides forming the coupling portion 2, the waveguides are divided into segmental portions corresponding to symmetrical waveguide segments. Then, an individual coefficient matrix relating to each segment is obtained. All the coefficient matrices thus obtained are multiplied to obtain a coefficient conversion matrix. Then, it is sufficient that the overall characteristics are analyzed by examining the wavelength dependence of each coefficient. This way of waveguide segmentation and coefficient matrix calculation is within the scope of the present invention.

When a coupling portion is both point and line symmetrical as shown in FIG. 11A, 11B or 11C, and FIG. 12A or 12B, where all the segmented waveguides in the coupling portion are symmetrical, this type of optical coupling device does not operate as a guided-wave optical branching device of a wide wavelength range operation type, and hence is excluded from the scope of the present invention.

Embodiment Group B

In embodiment group B, explanation will be made of embodiments of the present invention with respect to a guided-wave optical branching device where the shape of the entire directional coupler is formed neither to be a line symmetrical structure nor to be a point symmetrical structure.

FIG. 13 and FIGS. 14A, 14B and 14C are an enlarged plan view and enlarged cross sectional views showing a portion of a tapered directional coupler which is formed neither in a line symmetry nor in a point symmetry. As seen from Figs. 14A to 14C, the waveguides 1a and 1b have a square cross section having the same size or width at lines EE' and GG' and have rectangular cross sections at line FF'. The width of one of the waveguides at line FF' is wider than the widths of the square cross sections at lines EE' and GG', while the width of the other waveguide at line FF' is narrower than the widths of the square cross sections at lines EE' and GG', and both the widths at line FF' are different from each other. At various locations between lines EE' and FF' and between lines FF' and GG', the rectangular cross sections of the waveguides 1a and 1b vary linearly to have intermediate shapes between the cross sections at lines EE40 and FF' and between cross sections at lines FF' and GG'. Further, in this embodiment, both the maximum width of the waveguide 1a and the minimum width of the waveguide 1b occur at the same position FF' on the Z axis between lines EE' and GG'. This configuration is formed in order to make best use of the effect brought by the asymmetry of the waveguide layout. The present invention, however, is not limited to this specific configuration.

A coefficient conversion matrix M2 with respect to the tapered directional coupler in embodiment group B will be derived in the same manner as that in embodiment group A.

Figure 13:
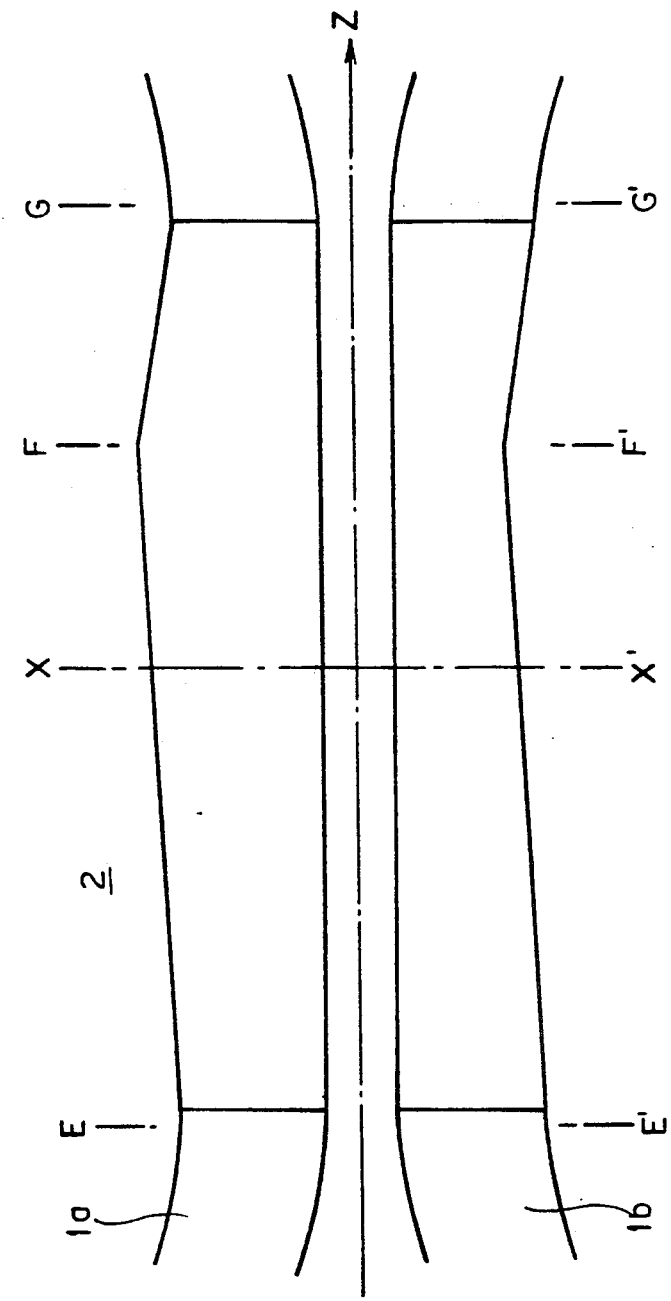
FIG. 13 is an enlarged plan view showing a basic structure of a tapered direction coupler formed neither in a line symmetry nor in a point symmetry of an embodiment group B of the present invention.
Figure 14A:
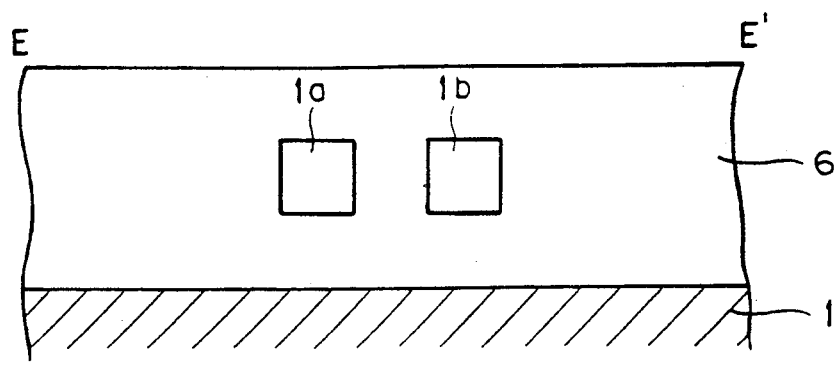
FIGS. 14A, 14B and 14C are cross sectional views showing the tapered directional coupler shown in FIG. 13, taken along line EE', line FF' and line GG', respectively.
Figure 14B:
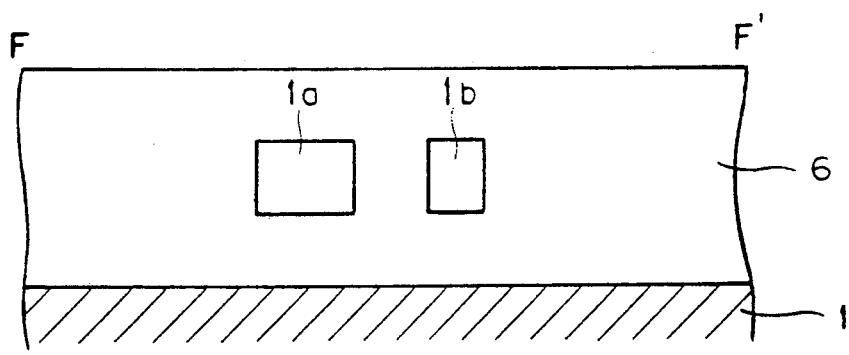
Figure 14C:
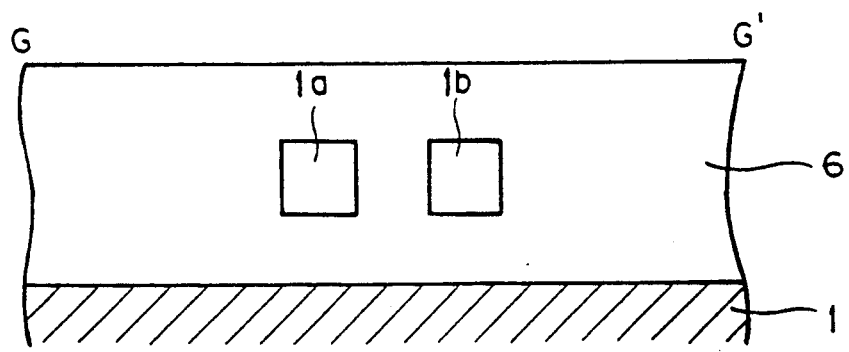
Figure 15:
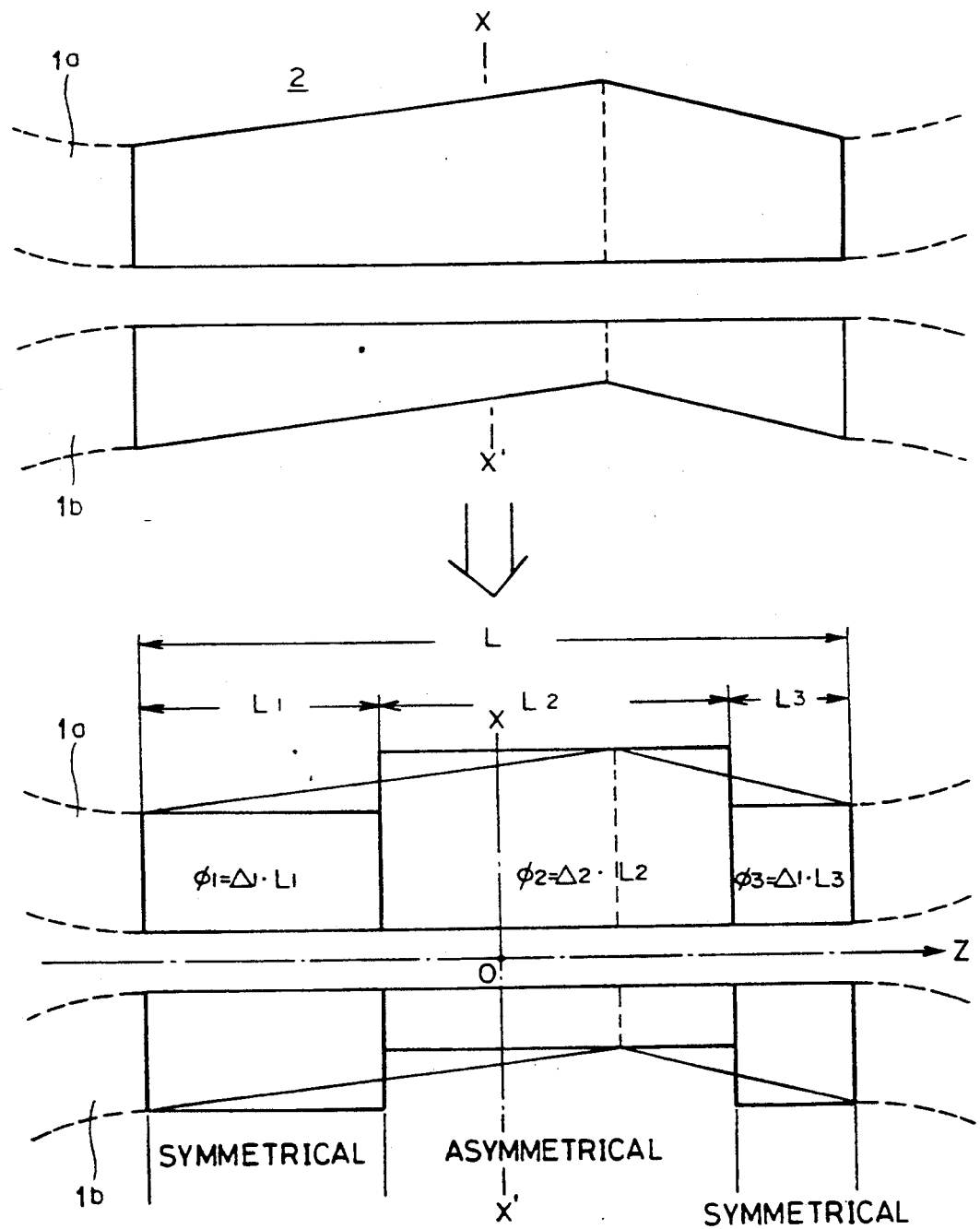
FIG. 15 is an explanatory schematic diagram for analyzing the tapered directional coupler of the present invention formed neither in a line symmetry nor in a point symmetry.

The tapered directional coupler as shown in FIG. 13 can be equivalent to a cascade connection of two symmetrical directional couplers and a single asymmetrical directional coupler, as shown in FIG. 15. While it is possible to divide the coupler into smaller segments, the example shown in FIG. 15 uses three segments for the sake of simplicity.

Output power (A, B) from the tapered directional coupler which is formed neither in a line symmetry nor in a point symmetry as shown in FIG. 15 is given by multiplying coefficient matrices corresponding to the two symmetrical directional couplers and the single asymmetrical directional coupler. Both the coefficient matrices are found in Equations (1) and (5). Thus, the output power (A, B) is expressed as follows.

$$\begin{pmatrix} A \\ B \end{pmatrix} = \begin{pmatrix} \cos \phi_1 & -j \cdot \sin \phi_1 \\ -j \cdot \sin \phi_1 & \cos \phi_1 \end{pmatrix} \cdot \quad (14)$$

$$\begin{pmatrix} \cos \phi_2 - j \cdot R \sin \phi_2 & -j \cdot S \sin \phi_2 \\ -j \cdot S \sin \phi_2 & \cos \phi_2 + j \cdot R \sin \phi_2 \end{pmatrix} \cdot$$

$$\begin{pmatrix} \cos \phi_3 & -j \cdot \sin \phi_3 \\ -j \cdot \sin \phi_3 & \cos \phi_3 \end{pmatrix} \begin{pmatrix} U \\ V \end{pmatrix}$$

The coefficient conversion matrix represented by Equation (14) is referred to as M2. M2 can be written as shown in Equation (15).

$$M_2 = \begin{pmatrix} a_2 & b_2 \\ c_2 & d_2 \end{pmatrix} = \begin{pmatrix} m_2 - jn_2 & -p_2 - jq_2 \\ p_2 - jq_2 & m_2 + jn_2 \end{pmatrix}, \quad (15)$$

where $$m_2 = \cos \phi_2 \cdot \cos(\phi_1 + \phi_3) - S \cdot \sin \phi_2 \cdot \sin(\phi_1 + \phi_3) \quad (16)$$

$$n_2 = R \cdot \sin \phi_2 \cdot \cos(\phi_1 - \phi_3)$$

$$p_2 = R \cdot \sin \phi_2 \cdot \sin(\phi_1 - \phi_3) \quad (17)$$

$$q_2 = S \cdot \sin \phi_2 \cdot \cos(\phi_1 + \phi_3) + \cos \phi_2 \cdot \sin(\phi_1 + \phi_3) \quad (18)$$

Accordingly, the output power of the tapered directional coupler shown in FIG. 13 is expressed by the following Equations (19) and (20).

$$P_1 \text{ (through)} = m_2^2 + n_2^2 = \{\cos \phi_2 \cdot \cos(\phi_1 + \phi_3) - S \cdot \quad (19)$$

$$\sin \phi_2 \cdot \sin(\phi_1 + \phi_3)\}^2 + R^2 \cdot \sin^2 \phi_2 \cdot \cos^2(\phi_1 - \phi_3) = 1 - P_2$$

$$P_2 \text{ (cross)} = p_2^2 + q_2^2 = R^2 \cdot \sin^2 \phi_2 \cdot \sin^2(\phi_1 - \phi_3) + \quad (20)$$

$$\{S \cdot \sin \phi_2 \cdot \cos(\phi_1 + \phi_3) + \cos \phi_2 \cdot \sin(\phi_1 + \phi_3)\}^2,$$

where $$\left. \begin{array}{l} \phi_1 = \kappa \cdot L_1 \\ \phi_2 = \Delta_2 \cdot L_2 \\ \quad = \sqrt{(\beta_a - \beta_b)^2/4 + \kappa^2} \cdot L_2 \\ \phi_3 = \kappa \cdot L_3 \end{array} \right\} \quad (21)$$

Figure 16:
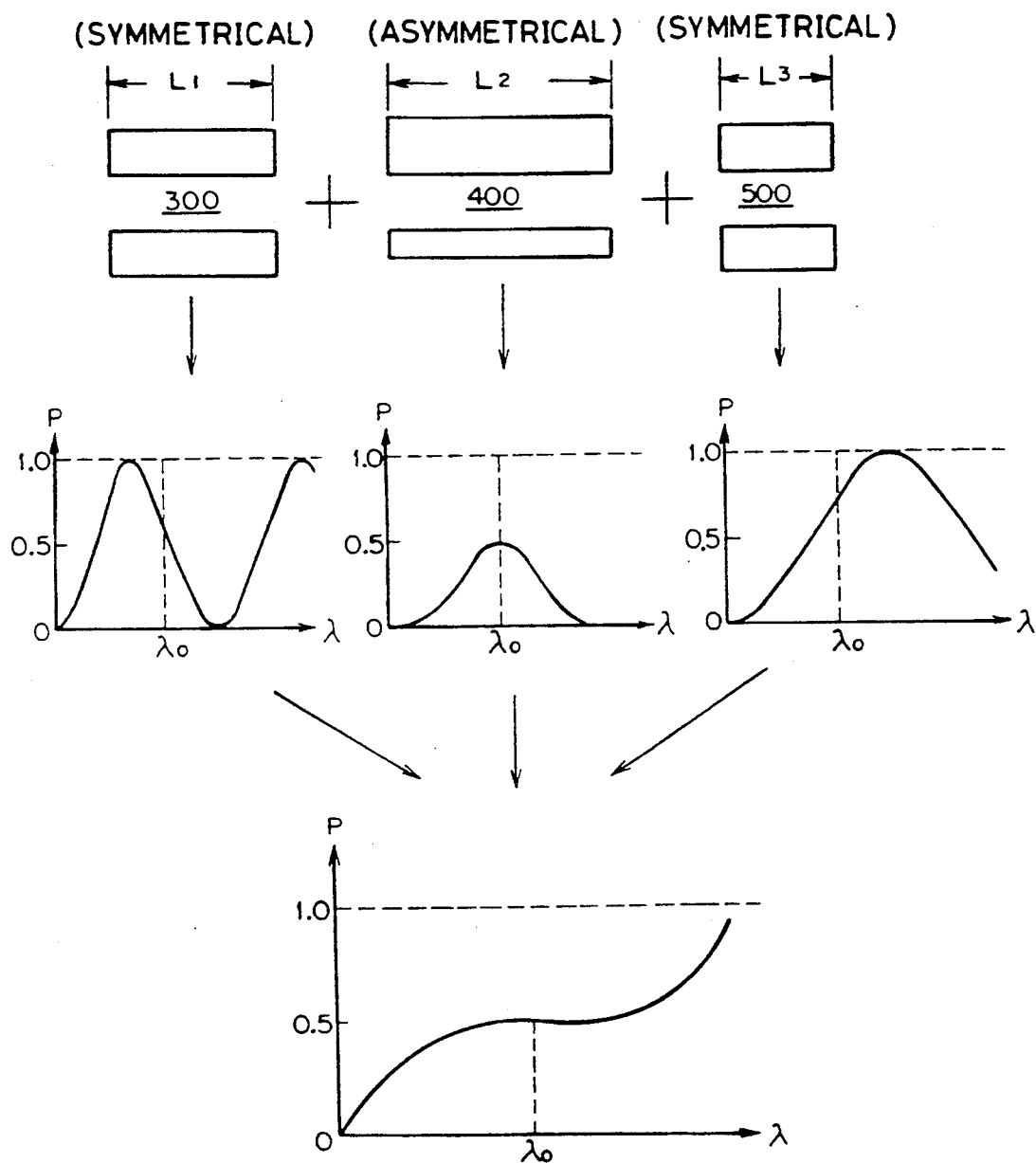
FIG. 16 illustrates the wavelength dependence characteristics expressed by Equation (20)
Figure 17A:
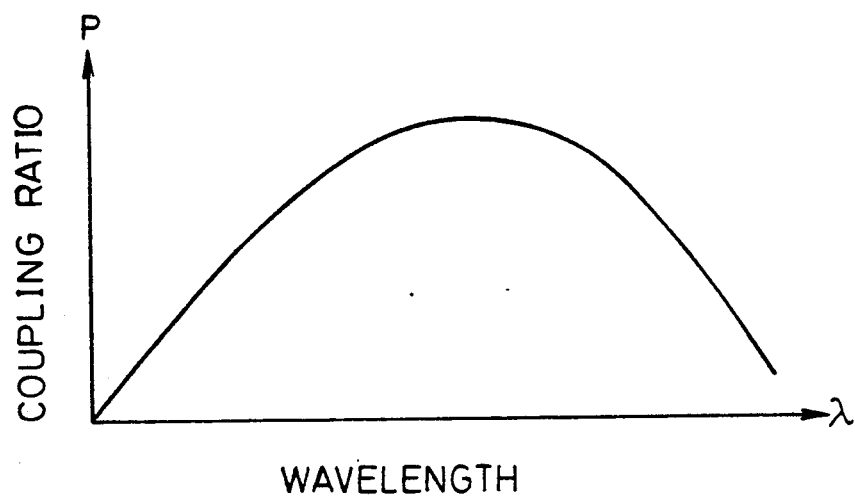
FIGS. 17A and 17B illustrate various kinds of wavelength dependence characteristics expressed by Equation (20)
Figure 17B:
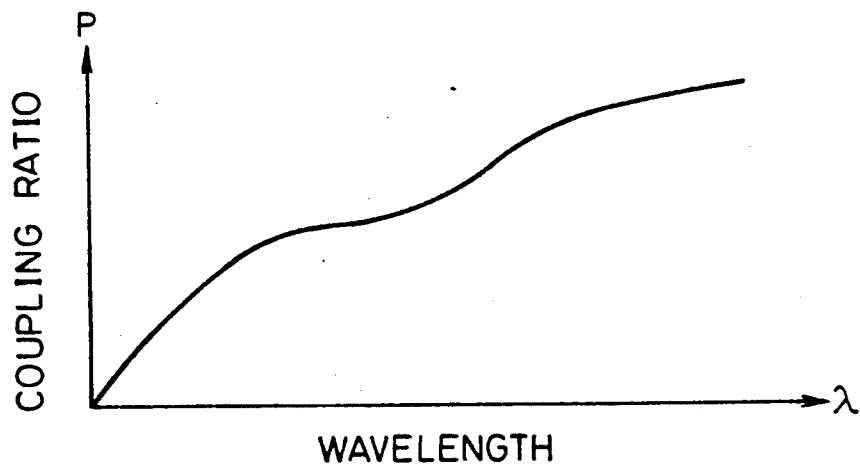
Figure 18A:
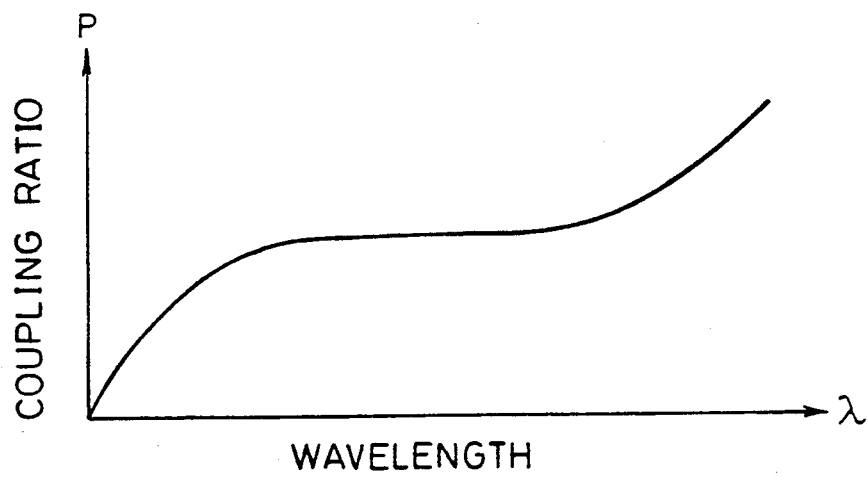
FIGS. 18A, 18B and 18C illustrate various kinds of wavelength dependence characteristics expressed by Equation (20)
Figure 18B:
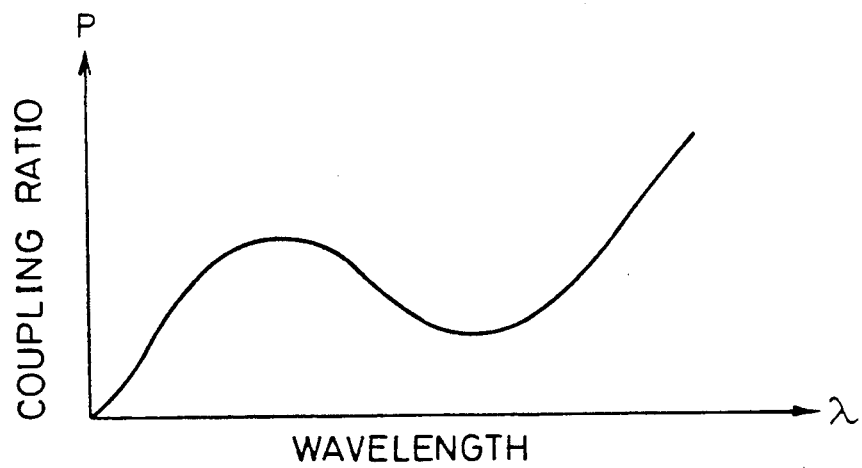
Figure 18C:
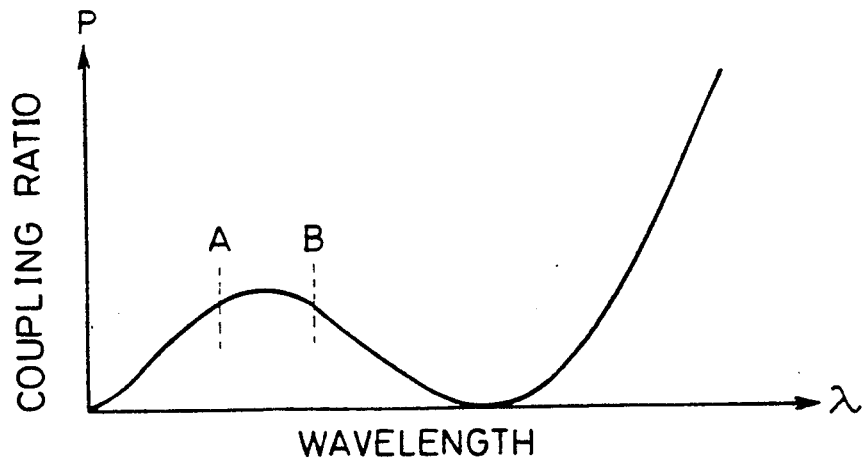

The meaning of Equation (20) can be construed as follows. The output power P2 roughly has characteristics in which sinusoidal values of the sum and the difference of two phases $\phi_1$ and $\phi_2$ are superimposed on each other. In a qualitative analysis, as shown in FIG. 16, the output power of the overall tapered directional coupler which has wave-length dependence is given by the superposition of the respective output powers of the cascade connection of a single asymmetrical directional coupler 400 and two symmetrical directional couplers 300 and 500. By selecting appropriate values for S, $\phi1$, $\phi2$ and $\phi3$ and making calculation in accordance with Equation (20), various kinds of output power characteristics with wavelength dependence as illustrated in FIGS. 17A and 17B and FIGS. 18A, 18B and 18C are obtained. Especially, the output power characteristics with wavelength dependence shown in FIG. 18A can provide flat characteristics having less wavelength dependence in a wide wavelength range.

Embodiment 4

Figure 19A:
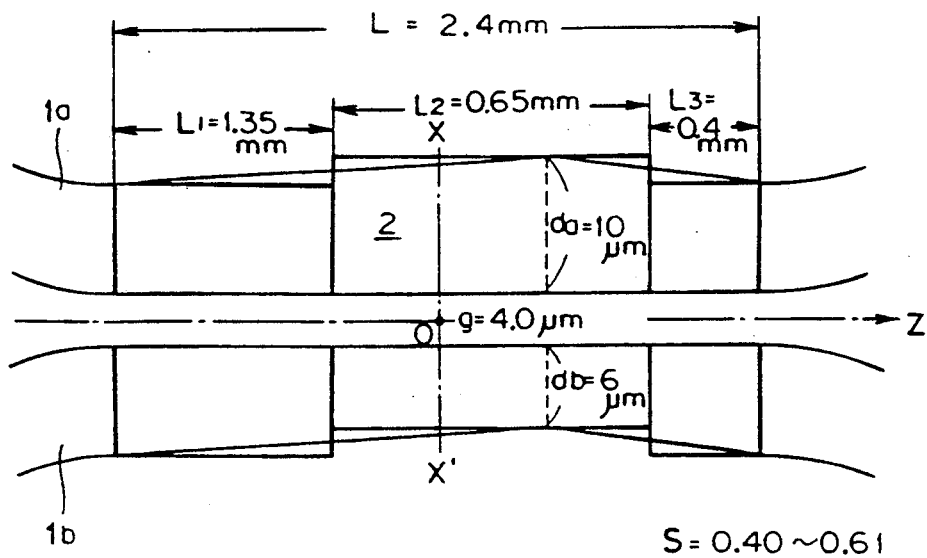
FIG. 19A is a plan view showing a structure of a fourth embodiment of a guided-wave optical branching device in accordance with the present invention.

FIG. 19A shows the fourth embodiment of a guided-wave optical branching device in accordance with the present invention. The structure of the optical branching device was designed so that the device had a coupling ratio of 50%±3% in the wavelength range of $\lambda1 = 1.2$ μm to $\lambda2 = 1.7$ μm.

In the configuration shown in FIG. 19A, the waveguides 1a and 1b were so placed that the gap g between the waveguides 1a and 1b was set to be 4.0 μm corresponding to the parameter S between 0.40 and 0.61, and the length L of the coupling of the waveguides 1a and 1b was set to be 2.4 mm. Furthermore, lengths L1, L2 and L3 of the segmented coupling regions were set to be 1.35 mm, 0.65 mm and 0.4 mm, respectively. The overall shape of the coupling portion 2 was neither line nor point symmetrical with respect to the X axis. In addition, in the process of fabricating a photo mask pattern, the maximum width da of the waveguides 1a and 1b was determined to be 10 μm and the minimum width db of the waveguides 1a and 1b was determined to be 6 μm. The distance between the input ports 3a and 3b was set to be 0.250 mm and the distance between the output ports 4a and 4b was set to be 0.250 mm. The port width of each of the input ports 3a and 3b was set to be ports 8 μm. The port width of each of the output 4a and 4b was set to be 8 μm.

Figure 19B:
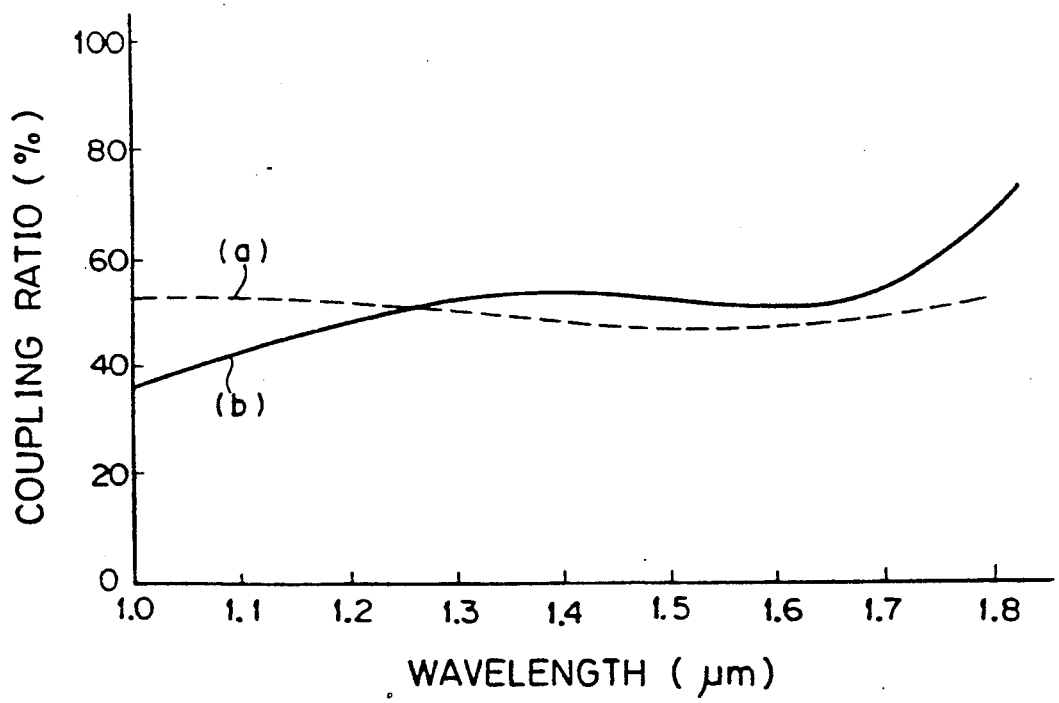
FIG. 19B illustrates the wavelength dependence characteristics of the coupling ratio in the optical branching device of the fourth embodiment.

FIG. 19B illustrates the wavelength dependence of the coupling ratio with respect to the optical branching device of the fourth embodiment of the present invention. The broken line (a) in FIG. 19B corresponds to the calculation result obtained from Equation (20). As seen from FIG. 19B, the coupling ratio was 50%±2% in the wavelength range between $\lambda1 = 1.2$ μm and $\lambda2 = 1.7$ μm and thus wide range frequency characteristics can be established.

In contrast, the solid line (b) in FIG. 19B corresponds to a calculation result with a higher accuracy based on the beam propagation method as described earlier. While flat characteristics of the coupling ratio were rather deteriorated in a shorter wavelength range not exceeding 1.2 μm and also in a longer wavelength range exceeding 1.65 μm, flat characteristics of 50%±3% of the coupling ratio can be established in a range between 1.3 μm and 1.6 μm.

The power loss in the overall optical branching device was sufficiently small and less than 0.2 dB. In the fourth embodiment of the present invention of an optical branching device, the flatness of the coupling ratio characteristics is enhanced in comparison with the prior art 2, and the input power loss is remarkably reduced. Therefore, a practical guided-wave optical branching device of a wide wavelength range operation type can be provided by the present invention.

Figure 20A:
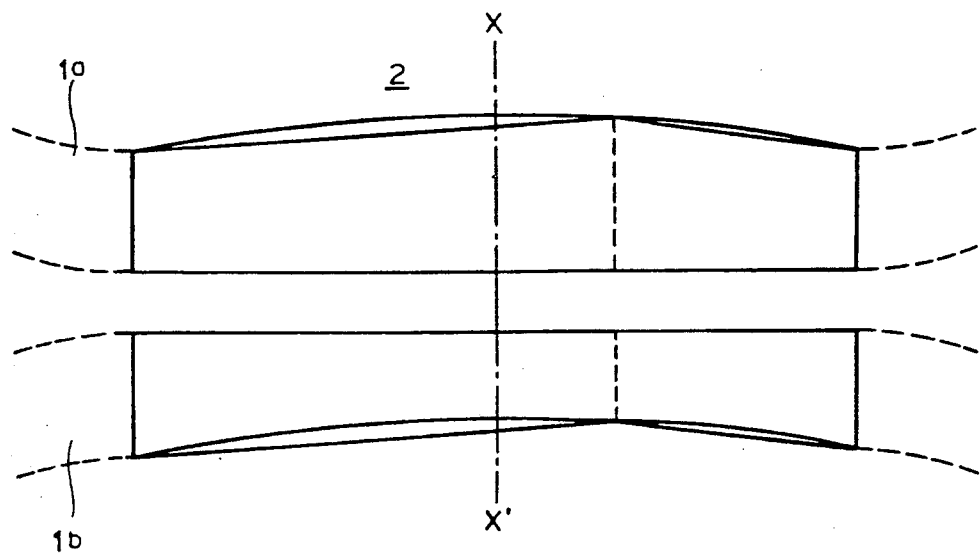
FIG. 20A is a plan view showing a modified embodiment of a guided-wave optical branching device in the case of forming the device of the fourth embodiment in a smoothly curved shape.
Figure 20B:
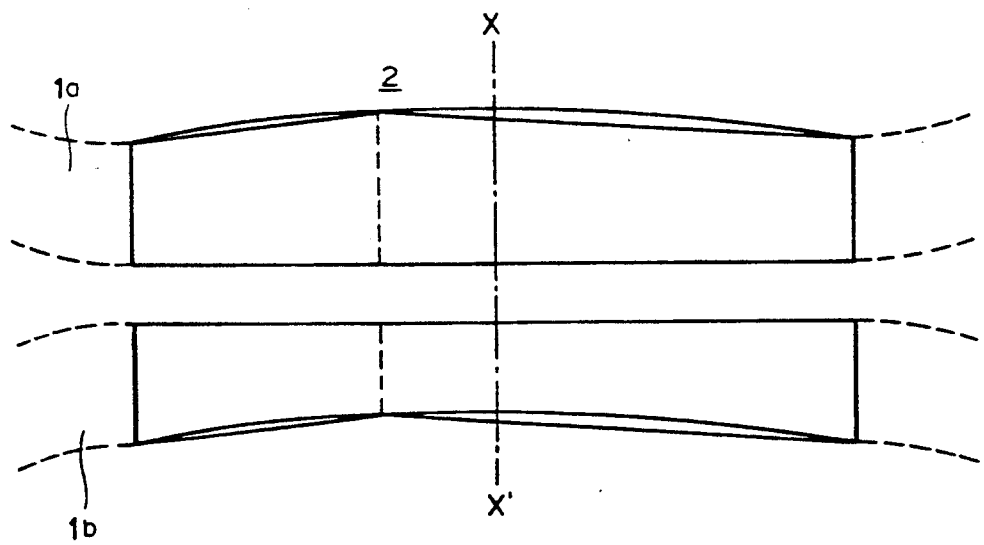
FIG. 20B is a plan view showing an embodiment of a structure in which the device shown in FIG. 19A

While the structure of the coupling portion 2 of the fourth embodiment of the present invention has a linearly tapered waveguide, there are possible modifications of the tapered directional coupler 2 with respect to the fourth embodiment in group B as described above. For example, as shown in FIG. 20A, the shape of the coupling portions may be smoothly and continuously curved. Alternatively, as shown in FIG. 20B, the waveguides 1a and 1b may be replaced with each other. In the following embodiments in embodiment group B, it is to be noted that various modifications such as the smooth shape or the replacement of the waveguides are included as a matter of course.

Embodiment 5

Figure 21A:
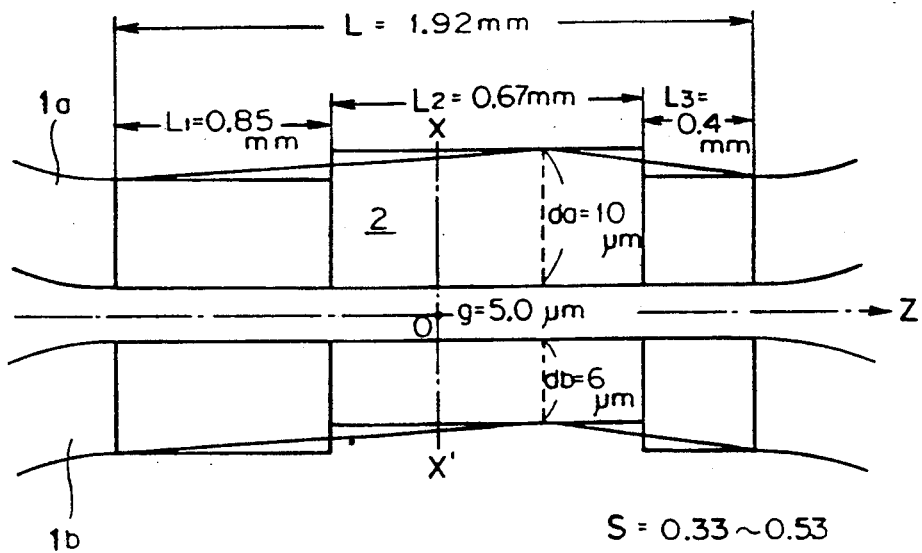
FIG. 21A is a plan view showing a structure of a fifth embodiment of a guided-wave optical branching device in accordance with the present invention.

FIG. 21A shows the fifth embodiment of a guided-wave optical branching device in accordance with the present invention. The structure of the optical branching device was designed so that the device had a coupling ratio of 20%±2% in the wavelength range of $\lambda1 = 1.0$ μm to $\lambda2 = 1.8$ μm.

In the configuration shown in FIG. 21A, the waveguides 1a and 1b were so placed that the gap g between the waveguides 1a and 1b was set to be 5.0 μm corresponding to the parameter S between 0.33 and 0.53, and the length L of the coupling region of the waveguides 1a and 1b was set to be 1.92 mm. Furthermore, the lengths L1, L2 and L3 of the segmented coupling regions were set to be 0.85 mm, 0.67 mm and 0.4 mm, respectively. The overall shape of the coupling portion 2 was neither line nor point symmetrical with respect to the X axis. In addition, in the process of fabricating a photo mask pattern, the maximum width da of the waveguides 1a and 1b was determined to be 10 μm and the minimum width db of the waveguides 1a and 1b was determined to be 6 μm. The distance between the input ports 3a and 3b was set to be 0.250 mm and the distance between the output ports 4a and 4b was set to be 0.250 mm. The port width of each of the input ports 3a and 3b was set to be 8 μm. The port width of each of the output ports 4a and 4b was set to be 8 μm.

Figure 21B:
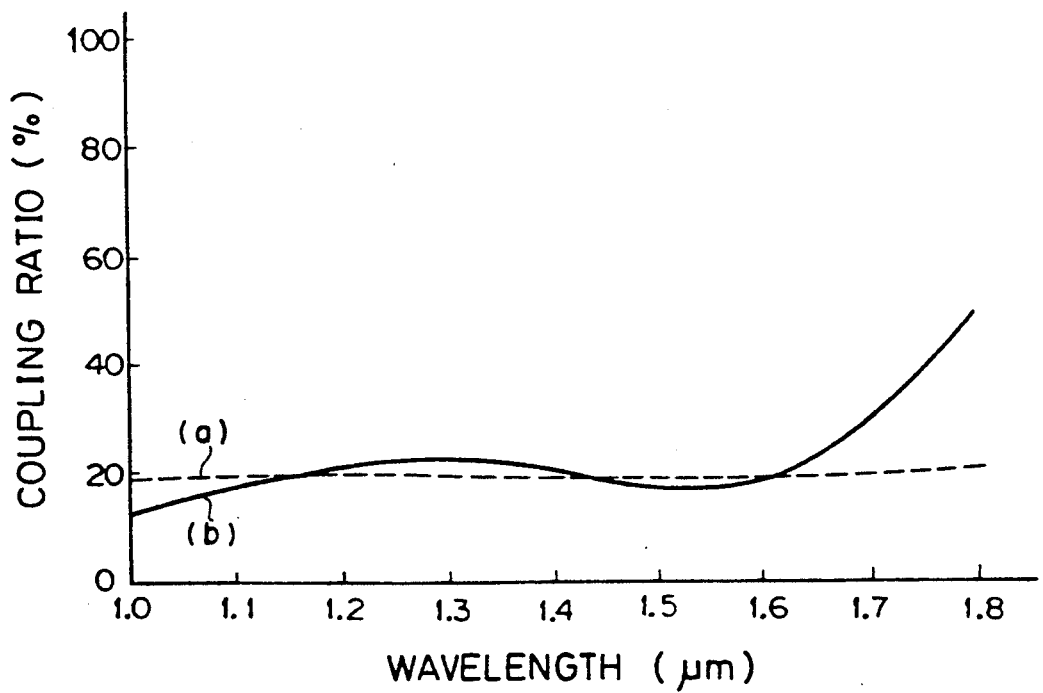
FIG. 21B illustrates the wavelength dependence characteristics of the coupling ratio in the optical branching device of the fifth embodiment.

FIG. 21B illustrates the wavelength dependence of the coupling ratio with respect to the optical branching device of the fifth embodiment of the present invention. The broken line (a) in FIG. 21B corresponds to the calculation result obtained from Equation (20). As seen from FIG. 21B, the coupling ratio was 20%±1% in the wavelength range between $\lambda1 = 1.0$ μm and $\lambda2 = 1.8$ μm and thus wide range frequency characteristics can be established.

In contrast, the solid line (b) in FIG. 21B corresponds to a calculation result with a higher accuracy based on the beam propagation method as described earlier. While flat characteristics of the coupling ratio were rather deteriorated rated in a shorter wavelength range not exceeding 1.2 μm and also in a longer wavelength range exceeding 1.65 μm, flat characteristics of 20%±2% of the coupling ratio can be established in a range between 1.3 μm and 1.6 μm.

The power loss in the overall optical branching device was sufficiently small and less than 0.2 dB. In the fifth embodiment of the present invention of an optical branching device, the flatness of the coupling ratio characteristics is enhanced in comparison with the prior art 2, and the input power loss is remarkably reduced. Therefore, a practical guided-wave optical branching device of a wide wavelength range operation type can be provided by the present invention.

Embodiment 6

Figure 22A:
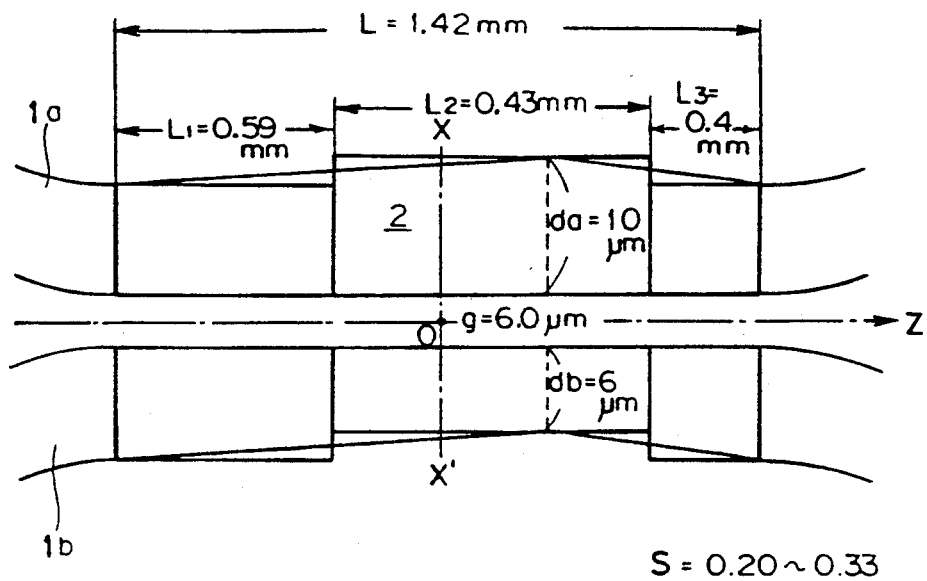
FIG. 22A is a plan view showing a structure of a sixth embodiment of a guided-wave optical branching device in accordance with the present invention.

FIG. 22A shows the sixth embodiment of a guided-wave optical branching device in accordance with the present invention. The structure of the optical branching device was designed so that the device had a coupling ratio of 5%±1% in the wavelength range of $\lambda 1 = 1.0$ μm to $\lambda 2 = 1.8$ μm.

In the configuration shown in FIG. 22A, the waveguides 1a and 1b were so placed that the gap g between the waveguides 1a and 1b was set to be 6.0 μm corresponding to the parameter S between 0.20 and 0.33, and the length L of the coupling region of the waveguides 1a and 1b was set to be 1.42 mm. Furthermore, the lengths L1, L2 and L3 of the segmented coupling regions were set to be 0.59 mm, 0.43 mm and 0.4 mm, respectively. The overall shape of the coupling portion 2 was neither line nor point symmetrical with respect to the X axis. In addition, in the process of fabricating a photo mask pattern, the maximum width da of the waveguides 1a and 1b was determined to be 10 μm and the minimum width db of the waveguides 1a and 1b was determined to be 6 μm. The distance between the input ports 3a and 3b was set to be 0.250 mm and the distance between the output ports 4a and 4b was set to be 0.250 mm. The port width of each of the input ports 3a and 3b was set to be 8 μm. The port width of each of the output ports 4a and 4b was set to be 8 μm.

Figure 22B:
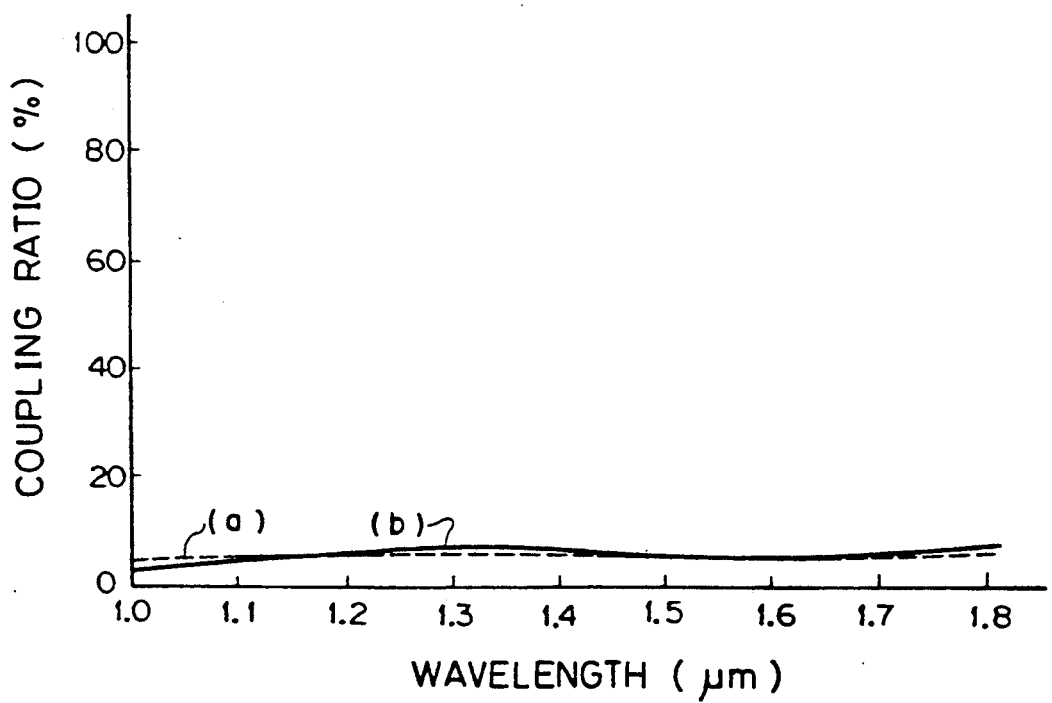
FIG. 22B illustrates the wavelength dependence characteristics of the coupling ratio in the optical branching device of the sixth embodiment.

FIG. 22B illustrates the wavelength dependence of the coupling ratio with respect to the optical branching device of the sixth embodiment of the present invention. The broken line (a) in FIG. 22B corresponds to the calculation result obtained from Equation (20). As seen from FIG. 22B, the coupling ratio was 5%±0.5% in the wavelength range between $\lambda 1 = 1.0$ μm and $\lambda 2 = 1.8$ μm and thus wide range frequency characteristics can be established.

In contrast, the solid line (b) in FIG. 22B corresponds to a calculation result with a higher accuracy based on the beam propagation method as described earlier.

The power loss in the overall optical branching device was sufficiently small and less than 0.2 dB. In the sixth embodiment of the present invention of an optical branching device, the flatness of the coupling ratio characteristics is enhanced in comparison with the prior art 2, and the input power loss is remarkably reduced. Therefore, a practical guided-wave optical branching device of a wide wavelength range operation type can be provided by the present invention.

In the above-mentioned embodiment group B of the present invention, any desired and substantially constant coupling ratio can be established in a desired range of wavelengths and a practical guided-wave optical branching device having a wide wavelength range and a reduced overall power loss can be provided.

In general, a directional coupler is a very sensitive optical circuit device in terms of its structure. Thus, a manufacturer can modify various parameters in consideration of the inherent nature of the various processing steps. In other words, it is sufficient that Equation (20) is examined in the respective embodiments to determine the coupling region lengths L1, L2 and L3, the asymmetry parameter S and so on.

When there is a plurality of tapered waveguides forming the coupling portion 2, the waveguides are divided into segmental portions corresponding to symmetrical waveguide segments and asymmetrical waveguide segments. Thus, an individual coefficient matrix relating to each segment is obtained. All the coefficient matrices thus obtained are multiplied to obtain a conversion matrix. Then, it is sufficient that the overall characteristics are analyzed by examining the wavelength dependence of each coefficient.

Embodiment Group C

In embodiment group C, explanation will be made of embodiments of the present invention with respect to a guided-wave optical branching device available in a wide range of wavelengths. In the embodiments, there will be described in detail a point symmetrical tapered directional coupler where the widths and the depths of two waveguides in the coupling region of a directional coupler are the same as those of the corresponding waveguides at the input ports and the output ports, respectively and the shape of the overall directional coupler is formed as a point symmetrical structure, which is point symmetrical with respect to the origin or point 0 at the center of the coupling portion 2 on the Z axis on the point where the X and Z axis crosses.

FIG. 23 and FIGS. 24A, 24B and 24C are an enlarged plan view of a point symmetrical tapered directional coupler and enlarged cross sectional views taken along lines EE' (also HH'), FF' (also GG') and XX', respectively. The point symmetrical tapered directional coupler is an important component in embodiment group C of the present invention. As seen from FIGS. 24A, 24B and 24C, the waveguides 1a and 1b have a square cross section having the same size at lines EE' and HH', and have rectangular cross sections at lines FF' and GG'. At line GG', the width of waveguide 1a is greater than that of waveguide 1b, and at line FF' the width of waveguide 1b is greater than that of waveguide 1a. The widths of waveguides 1a and 1b at lines GG' and FF' respectively are wider than the square cross sections of the waveguides at lines EE, HH' and XX, while the widths of waveguides 1b and 1a at lines GG' and FF' respectively are narrower than the sections at lines EE', HH' and XX'. At line XX', the cross section is square, as at lines EE' and HH'. At various locations between lines EE', and FF', between lines FF' and GG' and between lines GG' and HH', the rectangular cross sections of the waveguides 1a and 1b vary linearly to have an intermediate shape between the cross sections at lines EE' and FF', at lines FF' and GG' and at lines GG' and HH', respectively.

Figure 23:
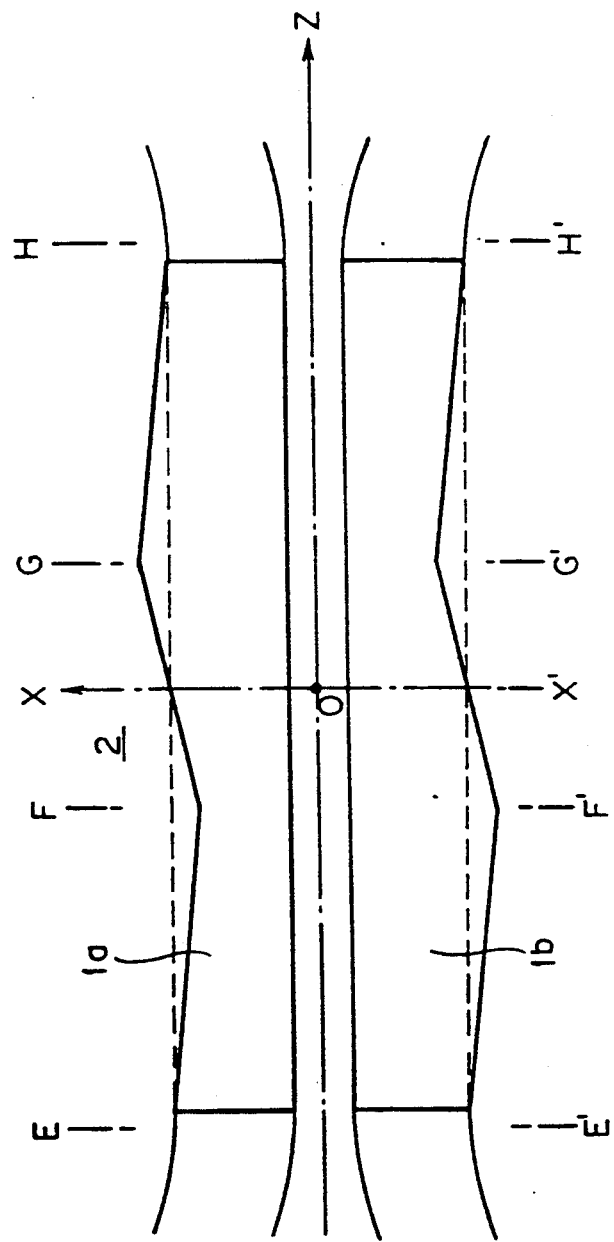
FIG. 23 is an enlarged plan view showing the basic structure of a point symmetrical tapered directional coupler of an embodiment group C of the present invention.
Figure 24A:
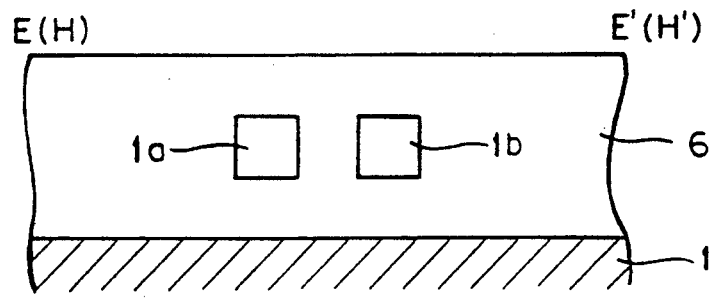
FIGS. 24A, 24B; and 24C are cross sectional views showing the point symmetrical tapered directional coupler shown in FIG. 23, taken along line EE' (also HH'), line FF' (also GG') and line XX', respectively.
Figure 24B:
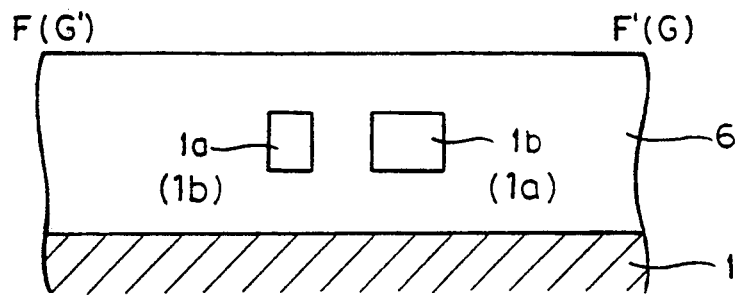
Figure 24C:
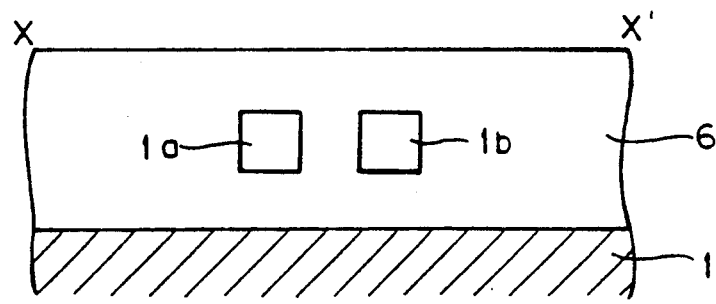
Figure 25:
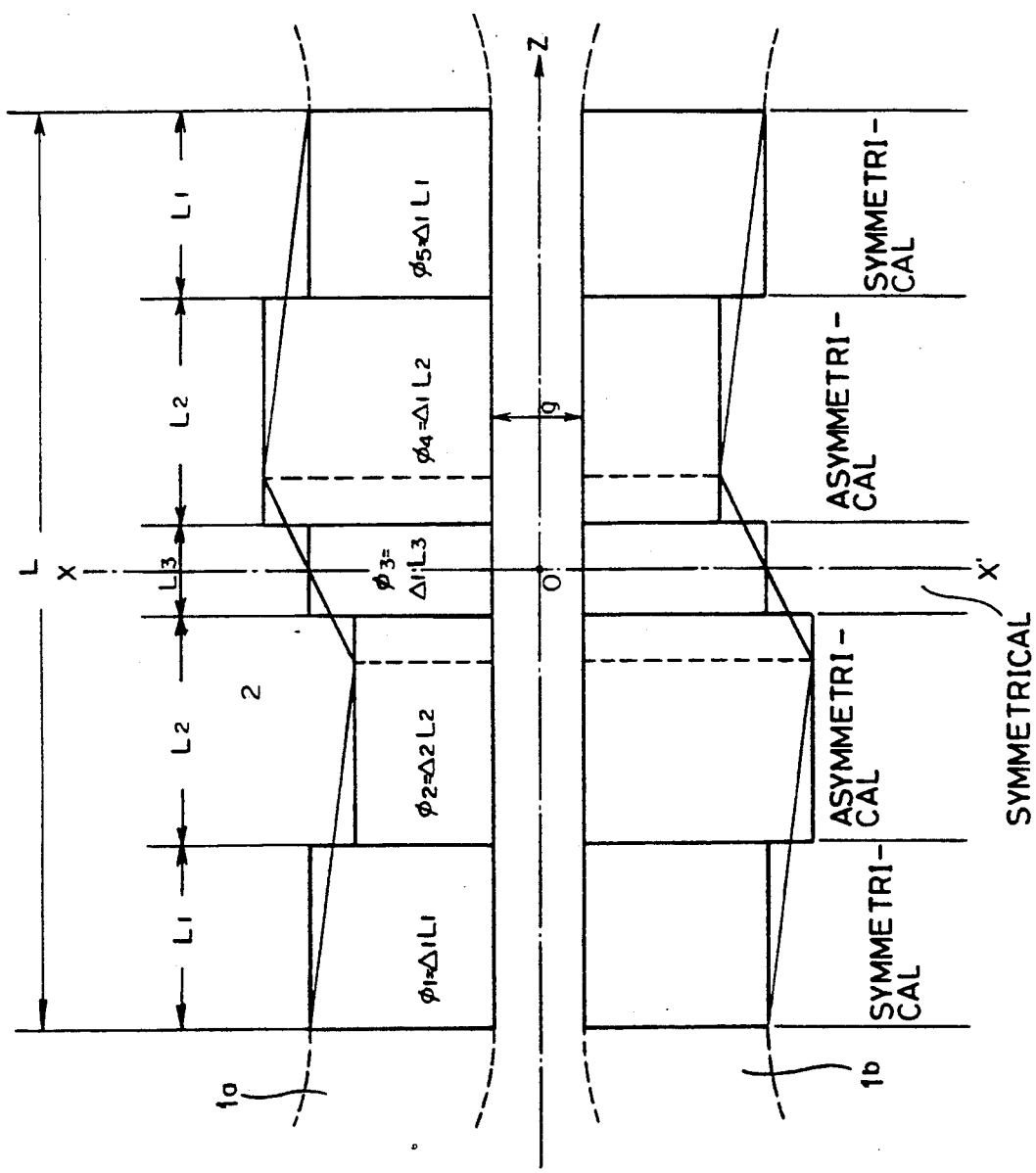
FIG. 25 is an explanatory schematic diagram for analyzing the point symmetrical tapered directional coupler shown in FIG. 23.

The point symmetrical tapered directional coupler 2 as shown in FIG. 23 can be analyzed as shown in FIG. 25, where the directional coupler 2 is segmented into three symmetrical directional couplers and two asymmetrical directional couplers connected in cascade. While it is possible to divide the directional coupler into smaller segments, the example shown in FIG. 25 uses segments obtained by dividing the portions between two adjacent cross section lines EE'-FF', FF'-XX', XX'-GG' and GG'-HH' into two segments. A coefficient conversion matrix M3 in this case is derived like the matrix M1 in embodiment group A.

Output power (A, B) from the point symmetrical tapered directional coupler as shown in FIG. 25 is given by multiplying coefficient matrices corresponding to the symmetrical directional couplers and the asymmetrical directional couplers. Both the coefficient matrixes are found in Equations (1) and (5). Thus, the output power (A, B) is expressed as follows.

$$\begin{pmatrix} A \\ B \end{pmatrix} = \begin{pmatrix} \cos\phi_1 & -j\cdot\sin\phi_1 \\ -j\cdot\sin\phi_1 & \cos\phi_1 \end{pmatrix} \quad (22)$$

$$\begin{pmatrix} \cos\phi_2 - j\cdot R\sin\phi_2 & -j\cdot S\sin\phi_2 \\ -j\cdot S\sin\phi_2 & \cos\phi_2 + j\cdot R\sin\phi_2 \end{pmatrix}.$$

$$\begin{pmatrix} \cos\phi_3 & -j\cdot\sin\phi_3 \\ -j\cdot\sin\phi_3 & \cos\phi_3 \end{pmatrix}.$$

$$\begin{pmatrix} \cos\phi_2 + j\cdot R\sin\phi_2 & -j\cdot S\sin\phi_2 \\ -j\cdot S\sin\phi_2 & \cos\phi_2 - j\cdot R\sin\phi_2 \end{pmatrix}$$

$$\begin{pmatrix} \cos\phi_1 & -j\cdot\sin\phi_1 \\ -j\cdot\sin\phi_1 & \cos\phi_1 \end{pmatrix} \cdot \begin{pmatrix} U \\ V \end{pmatrix}$$

In Equation (22), values of R and S of all the asymmetrical directional couplers are considered to be the same, since the taper angle is small enough to neglect the effect of wavelength difference, though the parameters R and S of each asymmetrical directional coupler are varied as the wavelength varies.

The coefficient conversion matrix represented by Equation (22) is referred to as M3. M3 can be expressed as shown in Equation (23).

$$M_3 = \begin{pmatrix} a_3 & b_3 \\ c_3 & d_3 \end{pmatrix} = \begin{pmatrix} m_3 \text{ (Real)} & p_3 + jq_3 \\ -p_3 + jq_3 & m_3 \text{ (Real)} \end{pmatrix}, \quad (23)$$

, where $$m_3 = (\cos^2\phi_2 = S^2\cdot\sin^2\phi_2)\cdot\cos(2\cdot\phi_1+\phi_3)$$
$$+(1=S^2)\cdot\sin^2\phi_2\cdot\cos(2\cdot\phi_1-\phi_3) - S\cdot\sin(2\cdot\phi_2)$$
$$\cdot\sin(2\cdot\phi_1+\phi_3) \quad (24)$$

$$p_3 = 2R\cdot\sin\phi_2\cdot(\cos\phi_2\cdot\sin\phi_3 + S\cdot\sin\phi_2\cdot\cos\phi_3) \quad (25)$$

$$q_3 = (\cos^2\phi_2 - S^2\cdot\sin^2\phi_2)\cdot\sin(2\cdot\phi_1+100_3) + (1-S^2)$$
$$\cdot\sin^2\phi_2\cdot\sin(2\cdot\phi_1-\phi_3) + S\cdot\sin(2\cdot\phi_2)\cdot\cos$$
$$(2\cdot\phi_1+\phi_3) \quad (26)$$

Accordingly, the output power of the point symmetrical tapered directional coupler shown in FIG. 25 is expressed by the following Equations (27) and (28).

$$P_1 \text{ (through)} = m_3^2 = [(\cos^2\phi_2 - S^2\cdot\sin^2\phi_2)\cdot \quad (27)$$
$$\cos(2\cdot\phi_1+\phi_3) + (1-S^2)\cdot\sin^2\phi_2\cdot\cos(2\cdot\phi_1-\phi_3) -$$
$$S\cdot\sin^2(2\cdot\phi_2)\cdot\sin^2(2\cdot\phi_1+\phi_3)]^2$$

and $$P_2 \text{ (cross)} = p_3^2 + q_3^2 = 1 - P_1 \quad (28)$$

Figure 26:
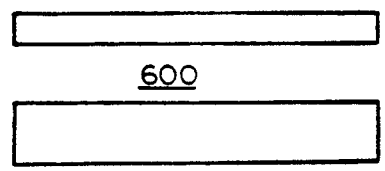
FIG. 26 is an explanatory diagram illustrating the wavelength dependence characteristics expressed by Equation (28)
Figure 26:
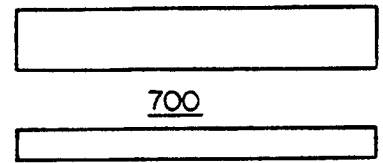
Figure 26:
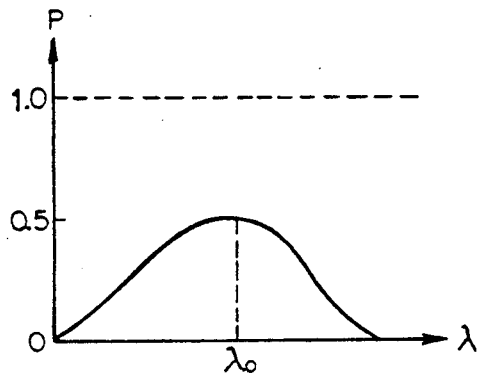
Figure 26:
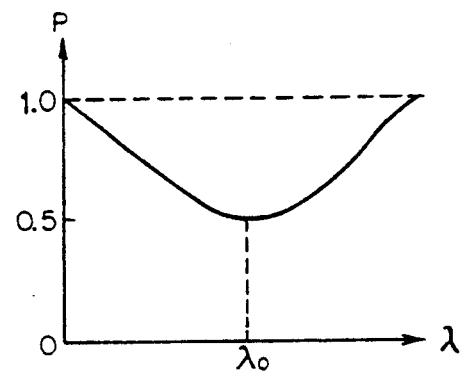
Figure 26:
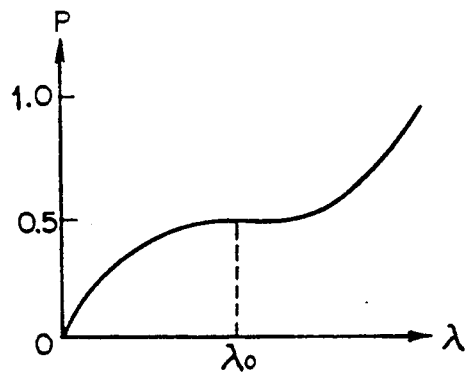

The meaning of Equation (28) can be construed as follows. The output power P2 roughly has characteristics in which cosine values of the sum and the difference of two phases $(2\cdot\phi_1)$ and $\phi_3$ are superimposed on each other. In a qualitative analysis, as shown in FIG. 26, the output power of the overall tapered directional coupler which has wavelength dependence is given by the superposition of the respective output powers of the cascade connection of a single asymmetrical directional coupler 600 and another asymmetrical directional coupler 700 where both optical waveguides of the former directional coupler 600 are replaced by each other. $\phi_3$ is the parameter determining the phase difference of the wavelength dependence. By selecting appropriate values for S, (2·100 1), and $\phi_3$ and making calculation in accordance with Equation (28), various kinds of output power characteristics with wavelength dependence as illustrated in FIGS. 17A and 17B and FIGS. 18A, 18B and 18C and described in embodiment group B are obtained. Especially, the output power characteristics with wavelength dependence shown in FIG. 18A can provide less flat characteristics having less wavelength dependence in a wide wavelength range. Parameters $\phi_1$, $\phi_2$ and $\phi_3$ are expressed by the following equations based on FIG. 25.

$$\phi_1 = \kappa\cdot L_1 \quad (29)$$

$$\phi_2 = \Delta_2\cdot L_2 = \sqrt{(\beta a - \beta b)^2/4 + \kappa^2}\cdot L_2$$

$$\phi_3 = \Delta_3\cdot L_3 = \kappa\cdot L_3$$

Embodiment 7

Figure 27A:
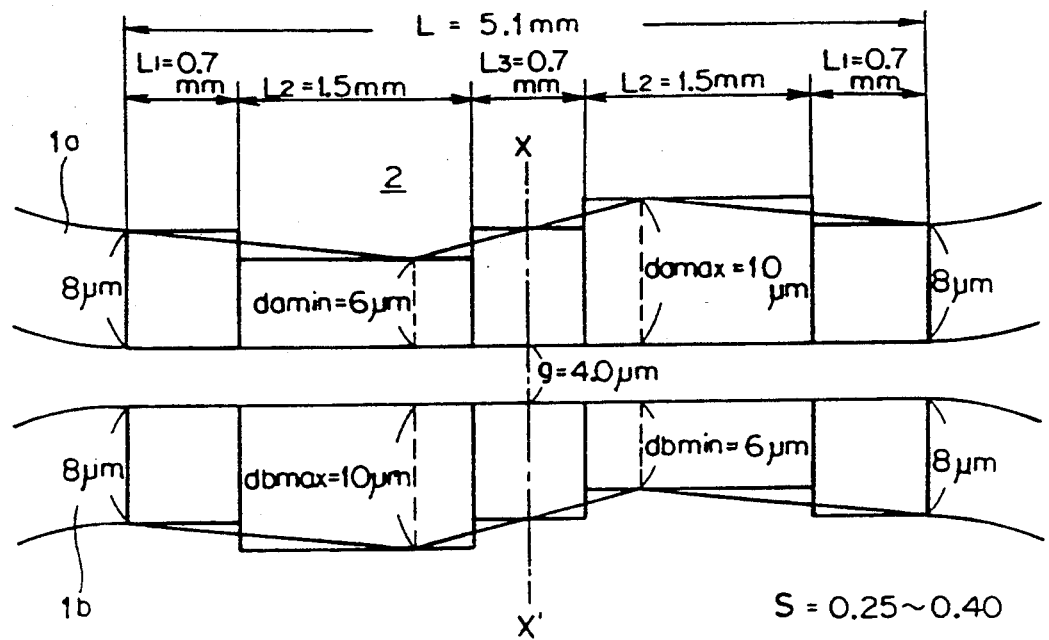
FIG. 27 is a plan view showing a structure of a seventh embodiment of a guided-wave optical branching device in accordance with the present invention.
FIG. 27B illustrates the wavelength dependence characteristics of the coupling ratio in the optical branching device of the seventh embodiment.

FIG. 27A shows the seventh embodiment of a guided-wave optical branching device in accordance with the present invention. The structure of the optical branching device was designed so that the device had a coupling ratio of 50%±1% in the wavelength range of $\lambda 1 = 1.0$ μm to $\lambda 2 = 1.7$ μm.

In the configuration shown in FIG. 27A, the waveguides 1a and 1b were so placed that the gap g between the waveguides 1a and 1b was set to be 4.0 μm corresponding to the parameter S between 0.25 and 0.40, and the length L of the coupling region of the waveguides 1a and 1b was set to be 5.1 mm. Furthermore, lengths L1, L2 and L3 of the segmented coupling regions were set to be 0.7 mm, 1.5 mm and 0.7 mm, respectively, in such a way that the overall shape of the coupling portion 2 was point symmetrical with respect to the point O (the origin). In addition, in the process of fabricating a photo mask pattern, the maximum width da of the waveguides 1a and 1b was determined to be 10 μm and the minimum width db of the waveguides 1a and 1b was determined to be 6 μm. The distance between the input ports 3a and 3b was set to be 0.250 mm and the distance between the output ports 4a and 4b was set to be 0.250 mm. The port width of each of the input ports 3a and 3b was set to be 8 μm. The port width of each of the output ports 4a and 4b was set to be 8 μm.

Figure 27B:
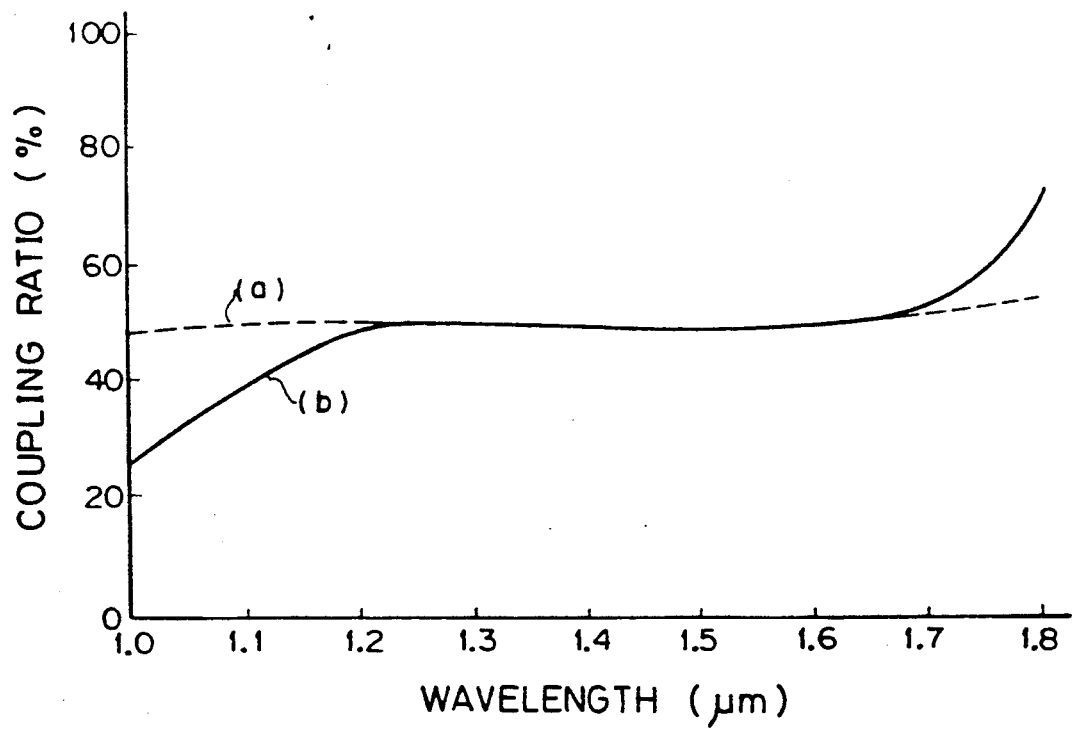

FIG. 27B illustrates the wavelength dependence of the coupling ratio with respect to the optical branching device of the seventh embodiment of the present invention. The broken line (a) in FIG. 27B corresponds to the calculation result obtained from Equation (28). As seen from FIG. 27B, the coupling ratio was 50%±2% in the wavelength range between $\lambda 1 = 1.0$ μm and $\lambda 2 = 1.7$ μm and especially the coupling ratio was 50%±1% in the wavelength range of 1.3 μm through 1.6 μm. Thus, wide range frequency characteristics can be established.

In contrast, the solid line (b) in FIG. 27B corresponds to a calculation result with a higher accuracy based on the beam propagation method as described earlier. While flat characteristics of the coupling ratio were rather deteriorated in a shorter wavelength range not exceeding 1.2 μm and also in a longer wavelength range exceeding 1.65 μm, flat characteristics of 50%±1% of the coupling ratio can be loss in the overall optical branching device was sufficiently small and less than 0.2 dB. In the seventh embodiment of the present invention of an optical branching device, the flatness of the coupling ratio characteristics is enhanced in comparison with the prior art 2, and the input power loss is remarkably reduced. Therefore, a practical guided-wave optical branching device of a wide wavelength range operation type can be provided by the present invention.

Figure 28A:
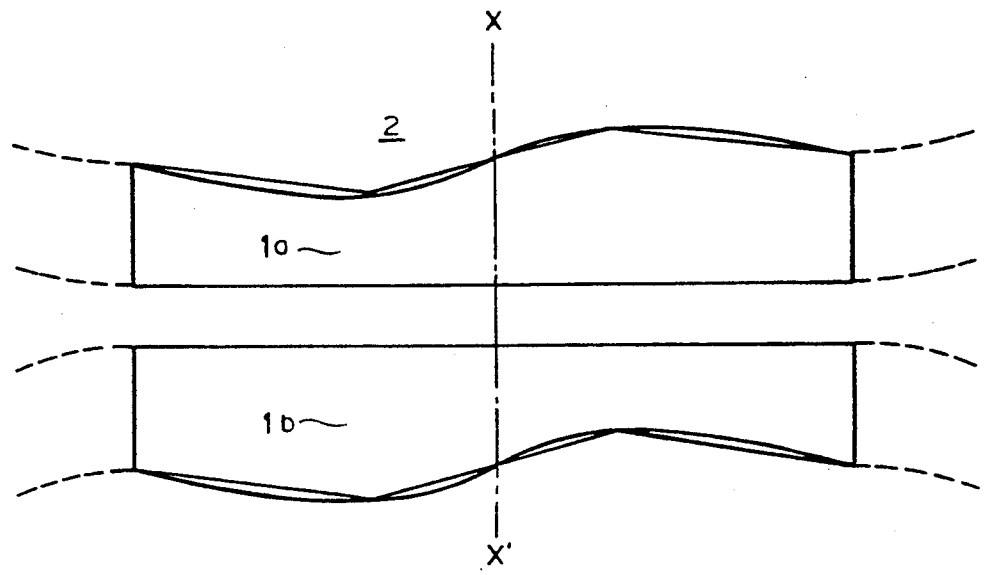
FIG. 28 is a plan view showing a modified embodiment of a guided-wave optical branching device in the case of forming the device of the seventh embodiment in a smoothly curved shape.
FIG. 28B is a plan view showing a modified embodiment of the device in which the input port and the output port shown in FIG. 27A are changed with each other.
Figure 28B:
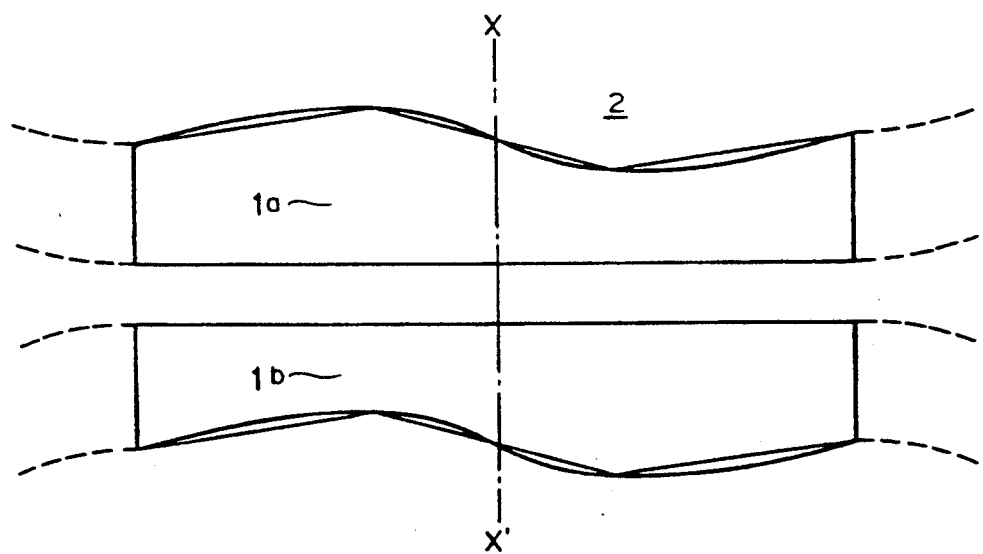

While the structure of the coupling portion 2 of the seventh embodiment of the present invention has a linearly tapered waveguide, there are possible modifications of the coupling portion 2 with respect to the seventh embodiment in group C as described above. For example, as shown in FIG. 28A, the shape of the coupling portions shown in FIG. 27 may be smoothly and continuously curved. Alternatively, as shown in FIG. 28B, the waveguides 1a and 1b may be replaced with each other. While the coupling portion 2 is designed so that L1 is equal to L3 in the seventh embodiment, it is alternatively possible to make L1 different from L3. In the following embodiments in embodiment group C to be described, various kinds of modifications such as the smooth shape, the replacement of the waveguides, or the structure of L1≠L3 are included as a matter of course.

Embodiment 8

Figure 29A:
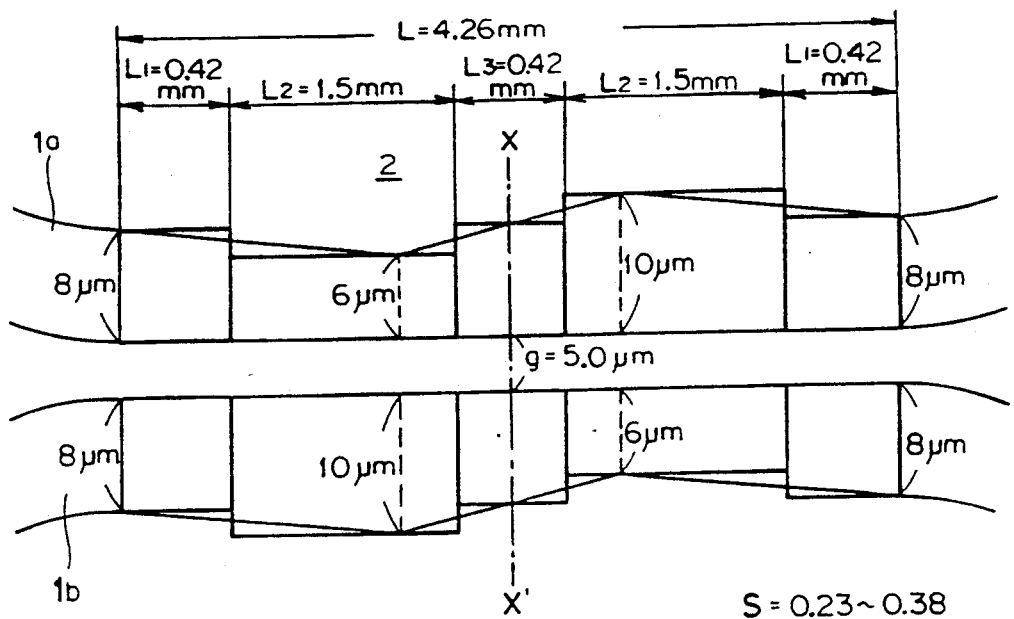
FIG. 29A is a plan view showing a structure of an eighth embodiment of a guided-wave optical branching device in accordance with the present invention.

FIG. 29A shows the eighth embodiment of a guided-wave optical branching device in accordance with the present invention. The structure of the optical branching device was designed so that the device had a coupling ratio of 20%±0.5% in the wavelength range of $\lambda 1 = 1.0$ μm to $\lambda 2 = 1.8$ μm.

In the configuration shown in FIG. 29A, the waveguides 1a and 1b were placed so that the gap g between the waveguides 1a and 1b was set to be 5.0 μm corresponding to the parameter S between 0.23 and 0.38, and the length L of the coupling region of the waveguides 1a and 1b was set to be 4.26 mm. Furthermore, lengths L1, L2 and L3 of the segmented coupling regions were set to be 0.42 mm, 1.5 mm and 0.42 mm, respectively, in such a way that the overall shape of the coupling portion 2 was point symmetrical with respect to the IC origin or point O. In addition, in the process of fabricating a photo mask pattern, the maximum width da of the waveguides 1a and 1b was determined to be 10 μm and the minimum width db of the waveguides 1a and 1b was determined to be 6 μm. The distance between the input ports 3a and 3b was set to be 0.250 mm and the distance between the output ports 4a and 4b was set to be 0.250 mm. The port width of each of the input ports 3a and 3b was set to be 8 μm. The port width of each of the output ports 4a and 4b was set to be 8 μm.

Figure 29B:
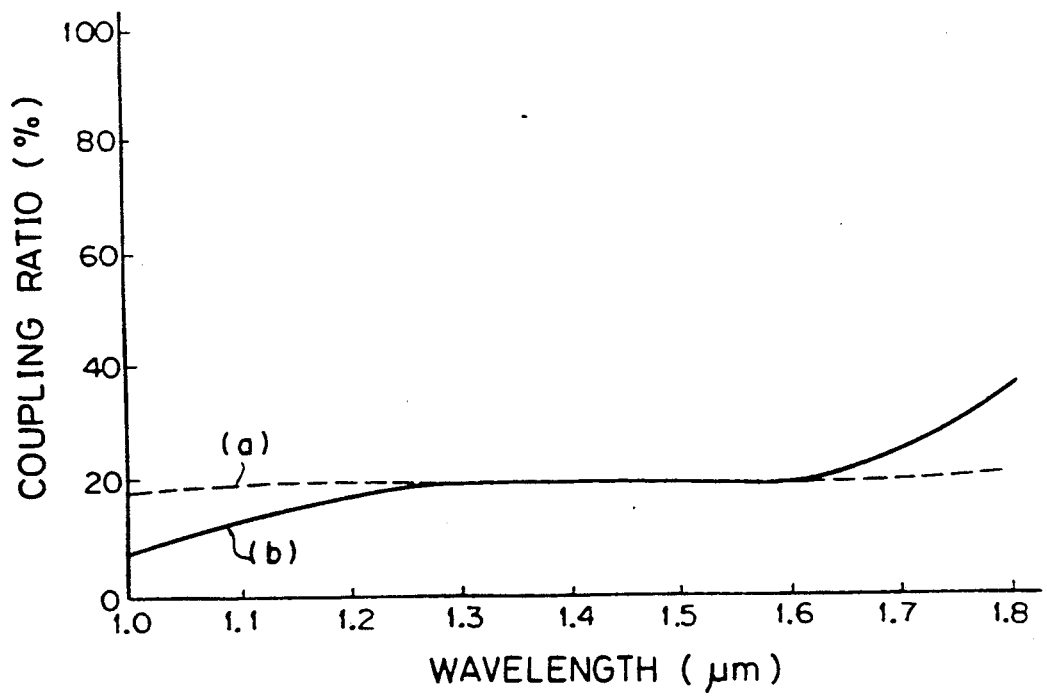
FIG. 29B illustrates the wavelength dependence characteristics of the coupling ratio in the optical branching device of the embodiment.

FIG. 29B illustrates the wavelength dependence of the coupling ratio with respect to the optical branching device of the eighth embodiment of the present invention. The broken line (a) in FIG. 29B corresponds to the calculation result obtained from Equation (28). As seen from FIG. 29B, the coupling ratio was 20%±1% in the wavelength range between $\lambda 1 = 1.0$ μm and $\lambda 2 = 1.7$ μm and especially the coupling ratio was 20%±0.5% in the wavelength range of 1.3 μm through 1.7 μm. Thus, wide range frequency characteristics can be established.

In contrast, the solid line (b) in FIG. 29B corresponds to a calculation result with a higher accuracy based on the beam propagation method as described earlier. While flat characteristics of the coupling ratio were rather deteriorated in a shorter wavelength range not exceeding 1.25 μm and also in a longer wavelength range exceeding 1.65 μm, flat characteristics of 20%±0.5% of the coupling ratio can be established in a range between 1.3 μm and 1.6 μm.

The power loss in the overall optical branching device was sufficiently small and less than 0.2 dB. In the eighth embodiment of the present invention of an optical branching device, the flatness of the coupling ratio characteristics is enhanced in comparison with the prior art 2, and the input power loss is remarkably reduced. Therefore, a practical guided-wave optical branching device of a wide wavelength range operation type can be provided by the present invention.

Embodiment 9

Figure 30A:
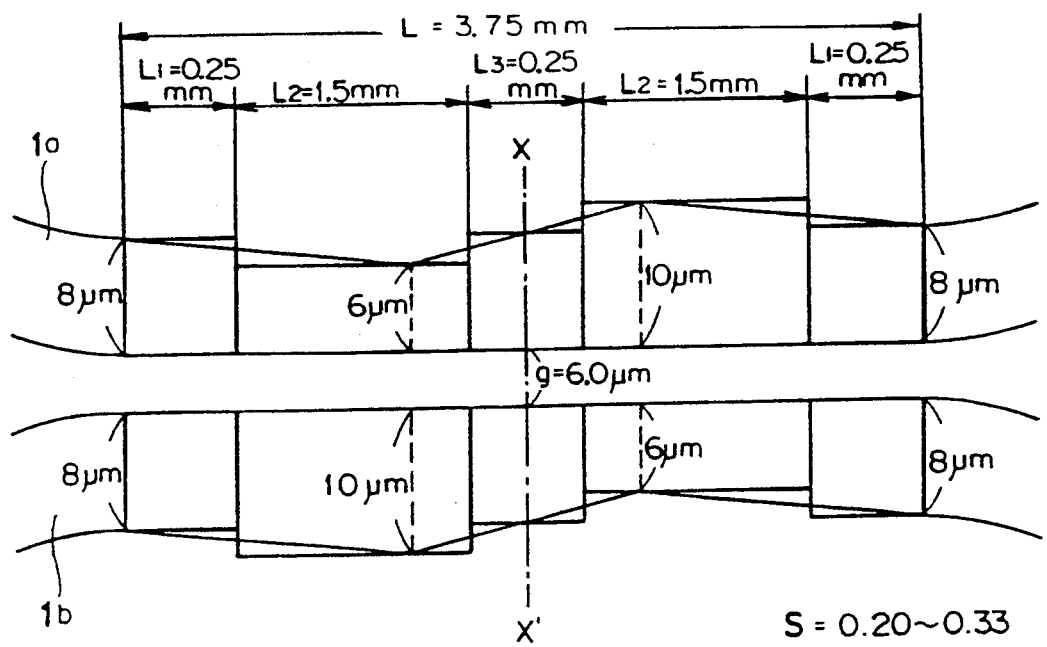
FIG. 30A is a plan view showing a structure of a ninth embodiment of a guided-wave optical branching device in accordance with the present invention.

FIG. 30A shows the ninth embodiment of a guided-wave optical branching device in accordance with the present invention. The structure of the optical branching device was designed so that the device had a coupling ratio of 5%±0.2% in the wavelength range of $\lambda 1 = 1.0$ μm to $\lambda 2 = 1.7$ μm.

In the configuration shown in FIG. 30A, the waveguides 1a and 1b were placed so that the gap g between the waveguides 1a and 1b was set to be 6.0 μm corresponding to the parameter S between 0.20 and 0.33, and the length L of the coupling region of the waveguides 1a and 1b was set to be 3.75 mm. Furthermore, the lengths L1, L2 and L3 of the segmented coupling regions were set to be 0.25 mm, 1.5 mm and 0.25 mm, respectively, in such a way that the overall shape of the coupling portion 2 was point symmetrical with respect to the origin or point O. In addition, in the process of fabricating a photo mask pattern, the maximum width da of the waveguides 1a and 1b was determined to be 10 μm and the minimum width db of the waveguides 1a and 1b was determined to be 6 μm. The distance between the input ports 3a and 3b was set to be 0.250 mm and the distance between the output ports 4a and 4b was set to be 0.250 mm. The port width of each of the input ports 3a and 3b was set to be 8 μm. The port width of each of the output ports 4a and 4b was set to be 8 μm.

Figure 30B:
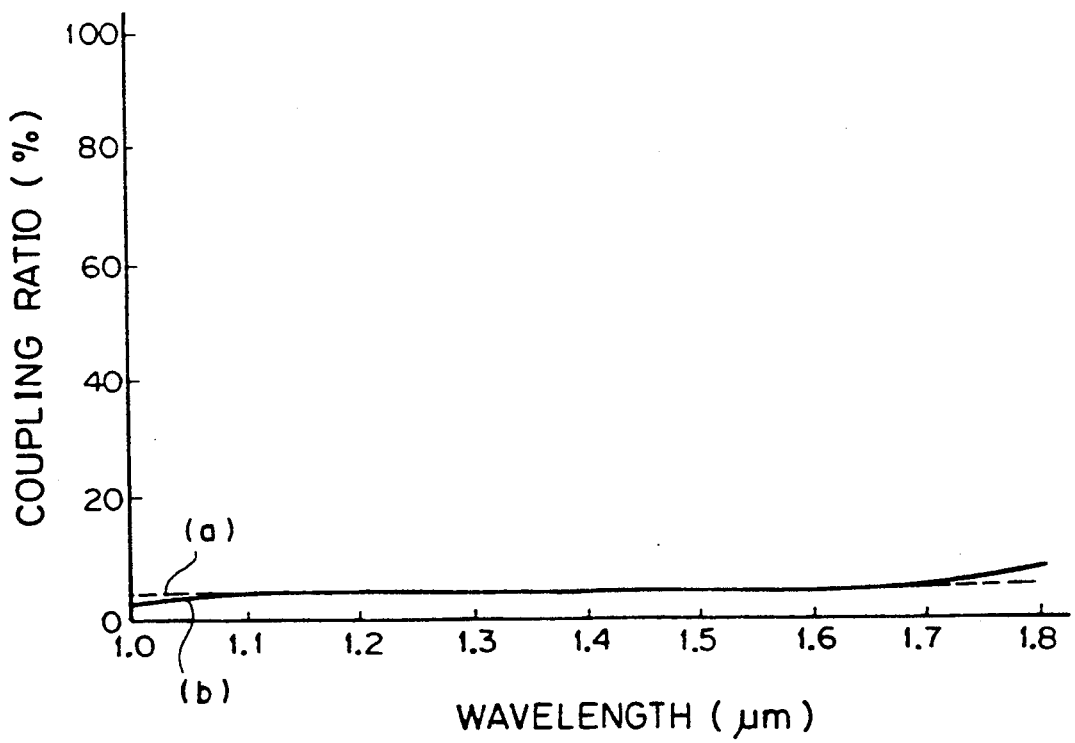
FIG. 30B illustrates the wavelength dependence characteristics of the coupling ratio in the optical branching device of the ninth embodiment.
Figure 31A:
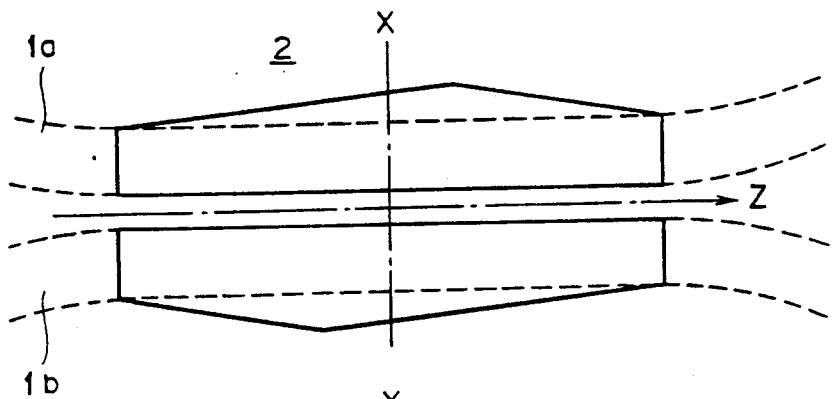
FIGS. 31A, 31B and 31C are plan views showing modified embodiments of a point symmetrical tapered directional coupler of the present invention.
Figure 31B:
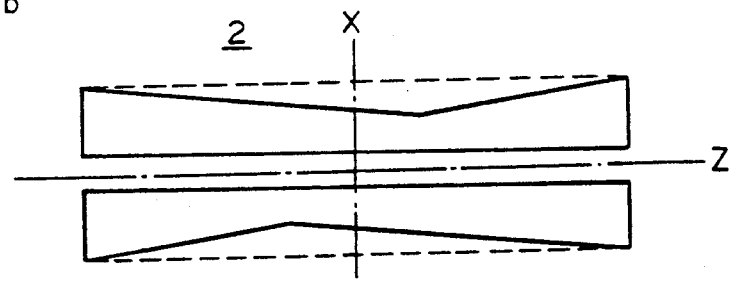
Figure 31C:
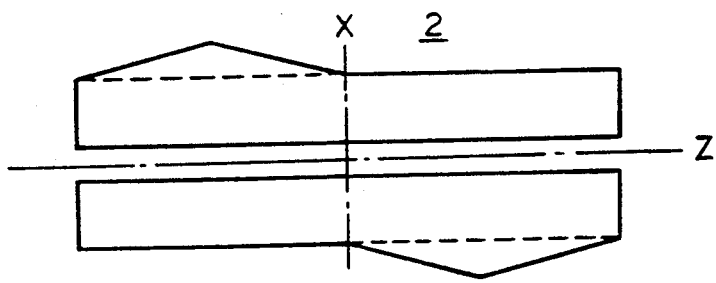
Figure 32A:
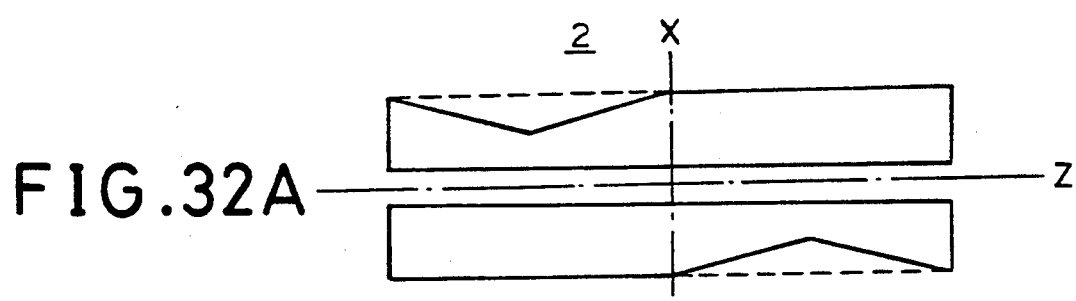
FIGS. 32A and 32B are plan views showing modified embodiments of a point symmetrical tapered directional coupler of the present invention.
Figure 32B:
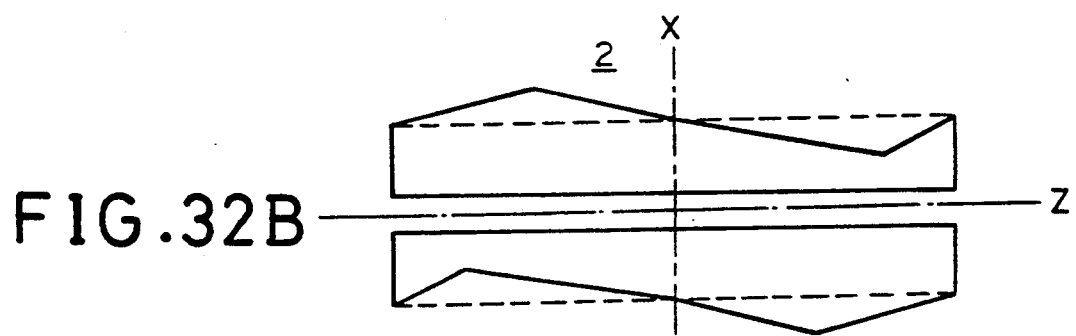

FIG. 30B illustrates the wavelength dependence of the coupling ratio with respect to the optical branching device of the ninth embodiment of the present invention. The broken line (a) in FIG. 30B corresponds to the calculation result obtained from Equation (28). As seen from FIG. 30B, the coupling ratio was 5%±0.5% in the wavelength range between $\lambda 1 = 1.0$ μm and $\lambda 2 = 1.7$ μm and especially the coupling ratio was 5%±0.2% in the wavelength range of 1.3 μm through 1.7 μm. Thus, wide range frequency characteristics can be established.

In contrast, the solid line (b) in FIG. 30B corresponds to a calculation result with a higher accuracy based on the beam propagation method as described earlier. While flat characteristics of the coupling ratio were rather deteriorated in a shorter wavelength range not exceeding 1.1 μm and also in a longer wavelength range exceeding 1.7 μm, flat characteristics of 5%±0.2% of the coupling ratio can be established in a range between 1.3 μm and 1.6 μm.

The power loss in the overall optical branching device was sufficiently small and less than 0.2 dB. In the ninth embodiment of the present invention of an optical branching device, the flatness of the coupling ratio characteristics is enhanced in comparison with the prior art 2, and the input power loss is remarkably reduced, and therefore, a practical guided-wave optical branching device of a wide wavelength range operation type can be provided by the present invention.

In the above mentioned embodiment group C of the present invention, any desired and substantially constant coupling ratio can be established in a desired range of wavelength and a practical guided-wave optical branching device having a wide wavelength range and a reduced power loss can be provided.

There may be various kinds of point symmetrical tapered directional couplers other than those described in the seventh through ninth embodiments. For example, various kinds of point symmetrical tapered directional couplers my be formed as shown in FIGS. 31A, 31B and 31C and FIGS. 32A and 32B. In the same manner as described in embodiment groups A and B, various kinds of guided-wave optical branching devices having a wide wavelength range can be embodied.

In other words, estimating Equation (28), by selecting values for coupling lengths L1, L2 and L3 and the asymmetry parameter S and so on, an optical branch coupler with desirable characteristics can be formed.

When there is a plurality of tapered waveguides forming the coupling portion 2, the waveguides are divided, segmental portions corresponding to symmetrical waveguide segments and asymmetrical waveguide segments. Thus, an individual coefficient matrix relating to each segment is obtained. All the coefficient matrices thus obtained are multiplexed to obtain a coefficient conversion matrix. Then, it is sufficient that the overall characteristics are analyzed by examining the wavelength dependence of each coefficient.

Embodiment Group D

While in the above mentioned first through ninth embodiments the present invention has been embodied as a two branching or two-output-port branching device having two output ports, the present invention is applicable to a multi branching or multi-output-port branching device having plural output ports. In the following, embodiments of a four branching or four-output-port branching device having four output ports will be described.

Embodiment 10

Figure 33:
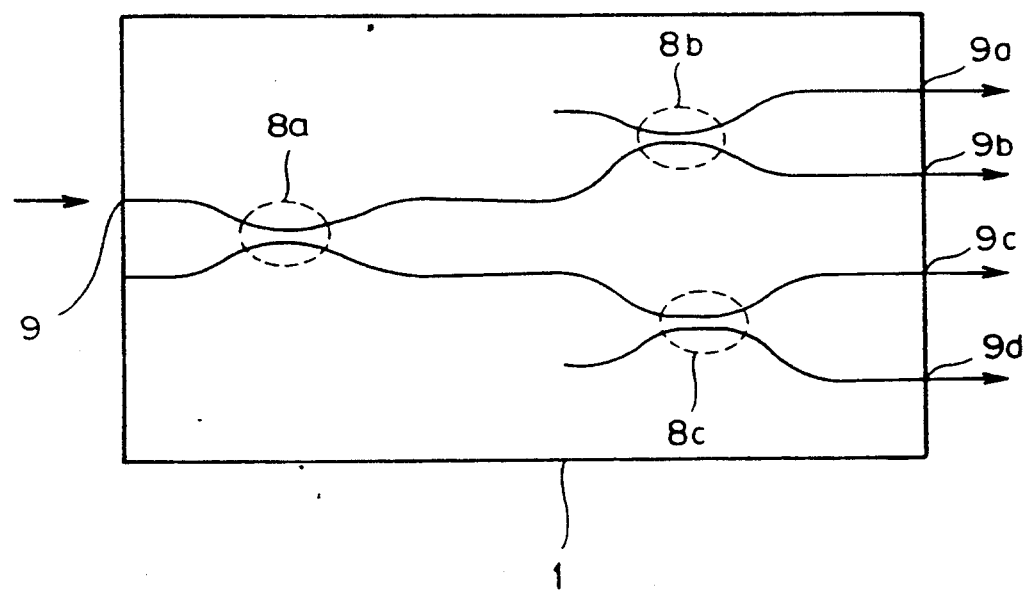
FIG. 33 is a plan view showing a four-output-port branching device as a tenth embodiment of the present invention.

FIG. 33 is a plan view showing a four-output-port branching or four-branching device as the tenth embodiment of the present invention. In FIG. 33, components 8a, 8b and 8c are two-output-port branching or two-branching devices formed on the same substrate 1. In this embodiment, each two-output-port branching device is an optical branching device with a coupling ration of 50% as shown in FIG. 6 of the first embodiment, FIG. 19 of the fourth embodiment or FIG. 27 of the seventh embodiment. Reference numeral 9 denotes an input port. Reference numerals 9a, 9b, 9c and 9d denote output ports. A signal light inputted to the input port 9 is branched into two output lights, which are guided through two waveguides. The respective branched lights are further branched into two output lights by optical branching devices 8b and 8c, and finally derived from the output ports 9a, 9b, 9c and 9d.

According to the configuration of the optical branching devices as shown in FIG. 33, the coupling ratio corresponding to each output port was 25%±5% in the wavelength range between 1.25 μm and 1.6 μm. In this way, a four-output-port branching device can be realized with desired characteristics having less dependence on wavelength and a low power loss. In this configuration, the substrate 1 had a dimension of 30 mm×5 mm, and the output ports 9a through 9d were arranged with a distance of 250 μm in accordance with the pitch of an optical fiber array.

Embodiment 11

Figure 34:
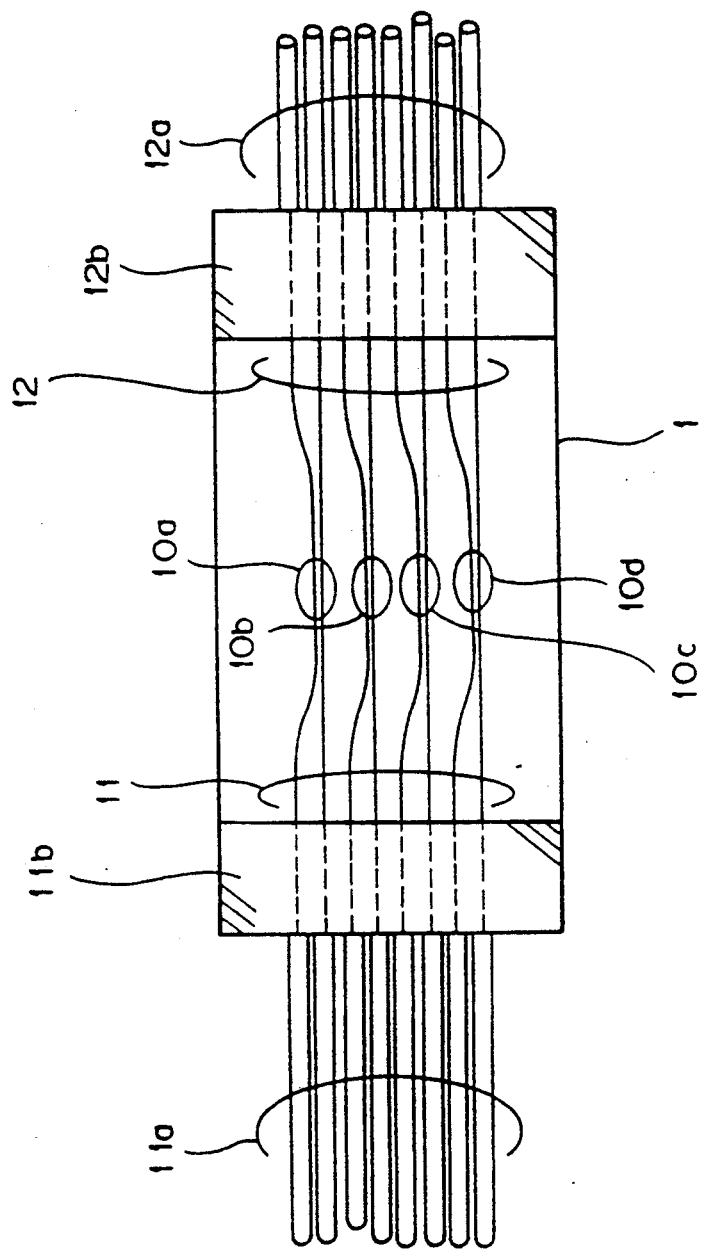
FIG. 34 is a plane view showing a structure of a guided-wave optical branching device array of a wide wavelength operation type as an eleventh embodiment of the present invention.

FIG. 34 is a plan view showing a guided-wave optical branching device array as the eleventh embodiment of the present invention. In FIG. 34, components 10a, 10b, 10c and 10d are optical branching devices with a coupling ratio of 50%, each having the same structure as that shown in FIG. 6 of the first embodiment, FIG. 19 of the fourth embodiment or FIG. 27 of the seventh embodiment, respectively.

These four optical branching devices 10a through 10d are arranged in parallel in the form of an array. Reference numerals 11b and 12b denote an input fiber array terminal and an output fiber array terminal, respectively. Both the pitch of the fibers in the array terminal 11b and 12b and the pitch of the waveguides in the input port array 11 and the output port array 12 were set to be 250 μm. The substrate 1 in this embodiment had a small dimension of 25 mm×5 mm, so that this configuration made the best use of the advantage of a guided-wave optical device in that a plurality of devices can be fabricated on a single substrate simultaneously.

While in the above mentioned embodiment, the optical branching devices are formed by silica-based ($SiO_2$-$TiO_2$) waveguides on a silicon substrate, the substrate used as a base material for the optical branching device is not limited to a silicon substrate but can be formed by a silica-based glass substrate. Alternatively, an $SiO_2$-$GeO_2$-based optical waveguide using $GeO_2$ as a major dopant in the core portion of the optical waveguide can also be used. Alternatively, as described earlier, the present invention is not limited to the silica-based waveguide, but can be applied to other types of waveguide materials including multi-component glass waveguides, $LiNbO_3$ waveguides, organic polymer waveguides and semiconductor waveguides.

Embodiment 12

Figure 35:
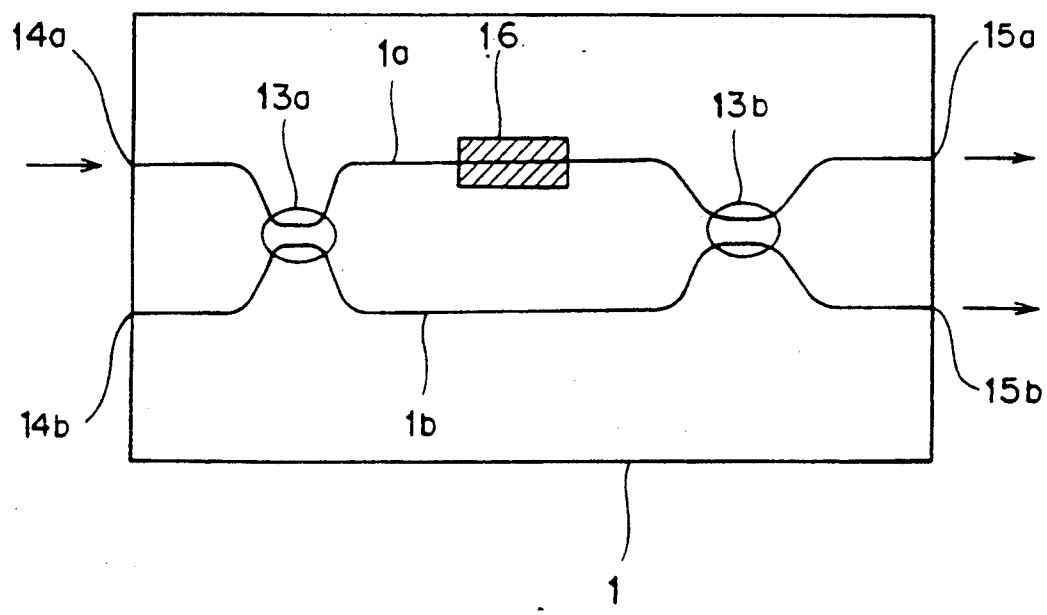
FIG. 35 is a plan view showing an embodiment of an optical switching device as a twelfth embodiment of the present invention.
Figure 36A:
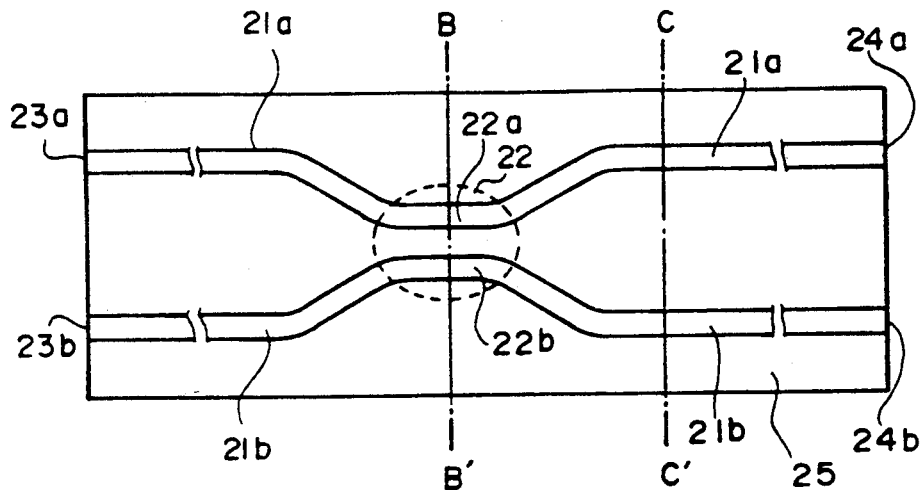
FIG. 36A a plan view showing an example of a first prior art symmetrical directional coupler (prior art 1)
Figure 36B:
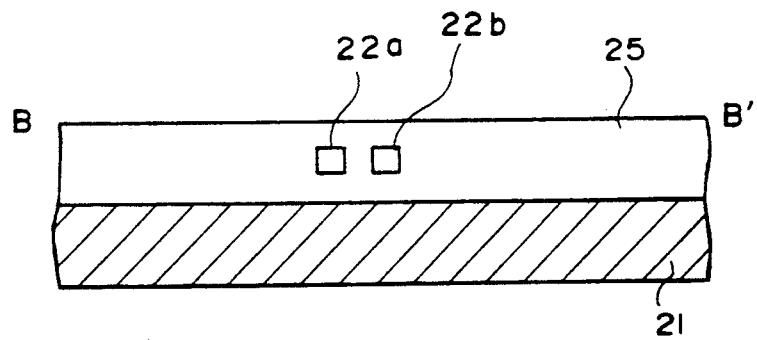
FIGS. 36B and 36C are cross sectional views showing the first prior art symmetrical directional coupler, taken along line BB' and line CC' respectively.
Figure 36C:
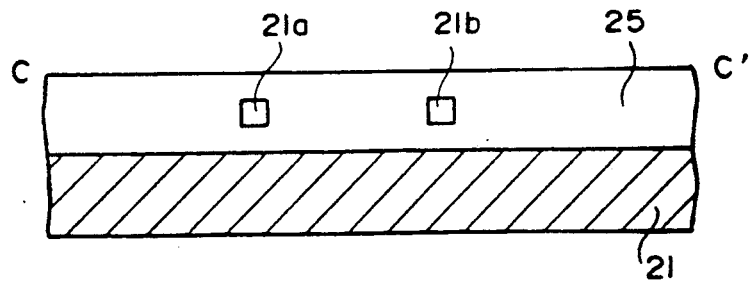
Figure 37:
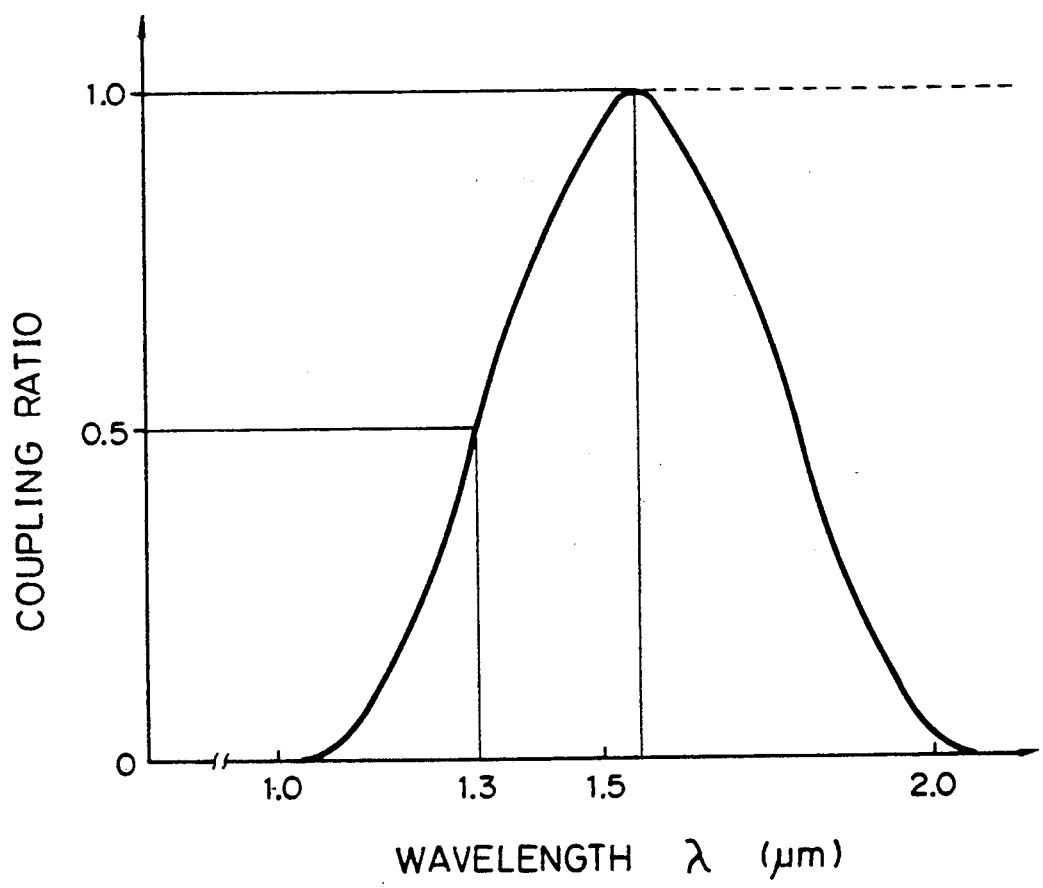
FIG. 37 illustrates wavelength dependence characteristics of a coupling ratio of the first prior art symmetrical directional coupler (prior art 1)

FIG. 35 is a plan view showing an optical branching device as the twelfth embodiment of the present invention. In FIG. 35, components 13a and 13b are optical branching devices with a coupling ratio of 50%, each having the same structure as shown in FIG. 6 of the first embodiment, FIG. 19 of the fourth embodiment or FIG. 27 of the seventh embodiment, respectively. These optical branching devices 13a and 13b are arranged in series, while the lengths of the two waveguides between the two branching devices 13a and 13b are the same to form a Mach-Zehnder interferometer circuit. Reference numerals 14a and 14b denote input ports and reference numerals 15a and 15b denote output ports. The distance between the two waveguides 1a and 1b outside the coupling portions was set to be 250 μm.

A thin film heater 16 is placed on one of the waveguides 1a and 1b between the two tapered directional couplers 13a and 13b formed as described above and the refractive index of the waveguide 1a heated by the thin film heater 16 is adjusted based on the thermo-optical effect, so that there is provided a difference in the optical path length between the waveguides 1a and 1b independently of the phase difference expressed in Equation (20) or (28). As a result, an optical branching device with desired characteristics can be realized. The thin film heater 16 can be on/off controlled to switch the coupling characteristics of the branching device between a higher wavelength dependence and a lower wavelength dependence.

As described in the above embodiments of the present invention, the widths and the depths of the two optical waveguides at both ends of the parallel coupling region are made equal to those of the optical waveguides at the input and output ports and the widths of the two optical waveguides in the parallel coupling region are made different from each other in at least one portion of the parallel coupling region. Alternatively, an asymmetrical directional coupler is formed in at least a part of the directional coupler. The widths of the waveguides in the parallel coupling region, the length of the coupling region in the symmetrical or asymmetrical directional coupler, the asymmetrical parameters or the like are set at values determined in accordance with the wavelength range used, so that the wavelength dependence of the coupling ratio of the power between the input port and the output port is reduced in a specific or desired wavelength range, for example, in a range of 1.2 $\mu$m through 1.8 $\mu$m. As a result, it is possible to provide an optical branching device having less wavelength dependence and lower power loss by using only one directional coupling device.

The guided-wave optical branching device of the present invention is expected to be a device for distributing, monitoring and tapping light signals over a wide frequency range. A four-output-port branching device, an eight-output-port branching device and so on can be easily formed by connecting the optical branching devices of the present invention in cascade.

According to the present invention, a plurality of optical branching devices can be formed in an array geometry on a single substrate, so that these arrayed optical branching devices are connected to an optical fiber array having optical fibers arranged at a pitch of 250 $\mu$m.

Furthermore, a plurality of guided-wave optical branching devices of the present invention can be formed on a single planar substrate simultaneously in the same fabrication process. Therefore, the fabrication cost of the devices can be reduced in a great amount, and the optical branching device of the present invention and various application using the optical branching devices contribute to widespread an optical communication system.

Furthermore, in order to realize a monolithic optical integrated circuit by integrating various kinds of optical functional circuits, the present invention can provide a wide wavelength range guided-wave optical branching device only having a single unit of a directional coupling device. Accordingly the space occupied by the guided-wave optical branching device is minimized. The optical branching device of the present invention is advantageously used to arrange a monolithic optical integrated circuit.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A guided-wave optical branching device comprising:
    a substrate having a substantially planar surface, an optical axis being defined therein; and
    at least fir and second optical waveguides disposed on the surface of said substrate on opposite sides of said optical axis, said first and second waveguides having input ports, output ports, and a tapered directional coupler portion interposed between said input and output ports wherein said first and second waveguides are in close proximity to each other, cross-sectional areas of said waveguides perpendicular to the surface of said substrate and said optical axis, a first and a second of said planes defining the cross-sectional areas of the first and second waveguides adjacent said input and output ports respectively, a third and a fourth of said planes defining the cross-sectional areas of said waveguides adjacent first and second ends of said coupler portion, a fifth plane defining the cross-sectional areas of said waveguides within said coupler portion at a location equally spaced from the first and second ends of said coupler portion, and a sixth plane defining cross-sectional areas of said waveguides intermediate the first and second ends of said coupler portion, the cross-sectional areas of said waveguides at said first, second, third and fourth planes being square, and the cross-sectional areas of said waveguides at said sixth plane being rectangular, the cross-sectional area of said first waveguide in said sixth plane being greater than the cross-sectional area of said second waveguide in said sixth plane, whereby the dependence of the coupling ratio between light impinging on an input port of at least one of said first and second waveguides and light emanating from the output ports of said waveguides on the wavelength of said light is mimimized.

2. A guided-wave optical branching circuit as claimed in claim 1 wherein said sixth plane coincides with said fifth plane, whereby the cross-sectional area of said first waveguide in said fifth plane is greater than the cross-sectional area of said second waveguide in said fifth plane, said tapered directional coupler portion being symmetrical with respect to a line in said fifth plane extending perpendicular to said optical axis.

3. A guided-wave optical branching circuit as claimed in claim 2 wherein the cross-sectional areas of said waveguides at said first, second, third and fourth planes are equal.

4. A guided-wave optical branching circuit as claimed in claim 2 wherein the cross-sectional shapes of the first and second waveguides between the fifth plane and said third and fourth planes varies gradually.

5. A guided-wave optical branching circuit as claimed in claim 3 wherein the depths of said first and second waveguides between said input and output ports in a direction perpendicular to the surface of said substrate are the same, and the widths of said first and second waveguides in said sixth plane in a direction parallel to the surface of said substrate are different.

6. A guided-wave optical branching circuit as claimed in claim 1 wherein said sixth plane is located between said fifth plane and one of said third and fourth planes, whereby the cross-sectional area of said first waveguide in said sixth plane is greater than the cross-sectional area of said second waveguide in said sixth plane, said tapered directional coupler portion being neither symmetrical with respect to a line in said fifth plane extending perpendicular to said optical axis nor a point at the intersection of said fifth plane and said optical axis.

7. A guided-wave optical branching circuit as claimed in claim 6 wherein the cross-sectional areas of said waveguides at said first, second, third and fourth planes are equal.

8. A guided-wave optical circuit as claimed in claim 7 wherein the cross-sectional shapes of the first and second waveguides between the sixth plane and said third and fourth planes varies gradually.

9. A guided-wave optical branching circuit as claimed in claim 7 wherein the depths of said first and second waveguides between said input and output ports in a direction perpendicular to the surface of said substrate are the same, and the widths of said first and second waveguides in said sixth plane in a direction parallel to the surface of said substrate are different.

10. A guided-wave optical branching circuit as claimed in claim 1 wherein the cross-sectional areas of said first and second waveguides in said fifth plane are square, said sixth plane is located between said fifth plane and said fourth plane, and a seventh plane is located between said fifth plane and said third plane, the cross-sectional areas of said first and second waveguides in said seventh plane being rectangular, the cross-sectional area of said first waveguide in said sixth plane being greater than the cross-sectional area of second waveguide in said sixth plane, and the cross-sectional area of said second waveguide in said seventh plane being greater than the cross-sectional area of said first waveguide in said seventh plane, the cross-sectional sectional areas of said first and second waveguides in said sixth and seventh planes respectively being greater than the cross-sectional areas of said first and second waveguides in said first, second, third, fourth and fifth planes, and the cross-sectional areas of said first and second waveguides in said seventh and sixth planes respectively being less than the cross-sectional areas of said first and second waveguides in said first, second, third, fourth and fifth planes, said tapered directional coupler portion being symmetrical with respect to a point at the intersection of said fifth plane and said optical axis.

11. A guided-wave optical branching circuit as claimed in claim 10 wherein the cross-sectional areas of said waveguides at said first, second, third, fourth and fifth planes are equal.

12. A guided-wave optical branching circuit as claimed in claim 10 wherein the cross-sectional shapes of the first and second waveguides very gradually between the third and seventh planes, the seventh and sixth planes, and the sixth and fourth planes.

13. A guided-wave optical branching circuit as claimed in claim 11 wherein the depths of said first and second waveguides between said input and output ports in a direction perpendicular to the surface of said substrate are the same, and the widths of said first and second waveguides in said sixth and seventh planes in a direction parallel to the surface of said substrate are different.

* * * * *